(12) United States Patent
Sargent et al.

(10) Patent No.: US 12,458,407 B2
(45) Date of Patent: Nov. 4, 2025

(54) ELASTIC BAR FOR PECTUS EXCAVATUM REPAIR

(71) Applicants: Children's Hospital Medical Center, Cincinnati, OH (US); Brigham Young University, Provo, UT (US)

(72) Inventors: Brandon Sargent, Provo, UT (US); Larry L. Howell, Orem, UT (US); Victor Garcia, Cincinnati, OH (US)

(73) Assignees: Children's Hospital Medical Center, Cincinnati, OH (US); Brigham Young University, Provo, UT (US)

( * ) Notice: Subject to any disclaimer, the term of this patent is extended or adjusted under 35 U.S.C. 154(b) by 305 days.

(21) Appl. No.: 18/108,998

(22) Filed: Feb. 13, 2023

(65) Prior Publication Data

US 2023/0255666 A1    Aug. 17, 2023

Related U.S. Application Data

(60) Provisional application No. 63/309,584, filed on Feb. 13, 2022.

(51) Int. Cl.
*A61B 17/68* (2006.01)
*A61B 17/16* (2006.01)
(Continued)

(52) U.S. Cl.
CPC .......... *A61B 17/68* (2013.01); *A61B 17/1662* (2013.01); *A61B 17/1693* (2013.01);
(Continued)

(58) Field of Classification Search
CPC ..... A61B 17/68; A61B 17/8076; A61B 17/66; A61B 17/8004; A61B 17/7016; A61B 17/8023; A61B 17/56; A61B 17/8085; A61B 17/8866; A61B 17/8869; A61B 17/8872; A61B 17/84; A61B 17/8863; A61B 17/842; A61B 17/8057; A61B 17/82; A61B 17/1662; A61B 17/1693; A61B 17/1792; A61B 17/1739; A61B 17/8061; A61B 2017/681; A61B 2017/00004; A61B 2017/564; A61F 2/02; A61F 2/07; A61F 2/915; A61F 2310/00023
USPC ... 606/86 R, 60, 280, 70, 71, 281, 283, 284, 606/285, 298, 299, 74, 78, 87, 101, 86 B, 606/902, 905, 907, 911, 915
See application file for complete search history.

(56) References Cited

U.S. PATENT DOCUMENTS 8,876,823 B2    11/2014   Li et al.
9,833,269 B2    12/2017   Park
(Continued)

FOREIGN PATENT DOCUMENTS

WO    WO 2015/056204    4/2015
WO    WO 2022/261110    12/2022

OTHER PUBLICATIONS

Sargent et al.; Modeling of the chest wall response to prolonged bracing in pectus carinatum, Dec. 2022, 11 pages.
(Continued)

*Primary Examiner* — Marcela I. Shirsat
(74) *Attorney, Agent, or Firm* — Bose McKinney & Evans LLP

(57) ABSTRACT

An implantable medical device, illustratively an elastic bar, for the gradual correction of pectus excavatum in patients.

24 Claims, 22 Drawing Sheets

(51) Int. Cl.
| | |
|---|---|
| A61B 17/17 | (2006.01) |
| A61B 17/56 | (2006.01) |
| A61B 17/80 | (2006.01) |
| A61B 17/82 | (2006.01) |
| A61B 17/84 | (2006.01) |
| A61B 17/88 | (2006.01) |

(52) U.S. Cl.
CPC .......... *A61B 17/1792* (2016.11); *A61B 17/56* (2013.01); *A61B 2017/564* (2013.01); *A61B 17/8004* (2013.01); *A61B 17/8057* (2013.01); *A61B 17/8061* (2013.01); *A61B 17/8076* (2013.01); *A61B 17/8085* (2013.01); *A61B 17/82* (2013.01); *A61B 17/842* (2013.01); *A61B 17/8863* (2013.01); *A61B 17/8869* (2013.01); *A61F 2310/00023* (2013.01)

(56) References Cited

U.S. PATENT DOCUMENTS

| | | | | |
|---|---|---|---|---|
| 2006/0058786 | A1* | 3/2006 | Kim | A61B 17/8076 606/60 |
| 2010/0256691 | A1* | 10/2010 | Park | A61B 17/8076 606/330 |
| 2011/0166612 | A1* | 7/2011 | Bardaji | A61B 17/8076 606/86 R |
| 2011/0184411 | A1* | 7/2011 | McKenzie | A61B 17/8076 606/60 |
| 2015/0134009 | A1* | 5/2015 | Licht | A61B 17/8014 606/291 |
| 2017/0156759 | A1* | 6/2017 | Park | A61B 17/8866 |
| 2024/0206929 | A1* | 6/2024 | Parkinson | A61B 17/8004 |

OTHER PUBLICATIONS

Chung et al.; Factors Affecting Risks of Congenital Malformations; vol. XI, No. 10, 975; 4 pages.

Schulz-Drost et al.; Elastic stable chest repair and its hybrid variants in 86 patients with pectus excavatum; J Thorac Dis 2018;10(10):5736-5746, Oct. 2018, 11 pages.

Schulz-Drost et al.; From pullout-techniques to modular elastic stable chest repair the evolution of an open technique in the correction of pectus excavatum; J. Thorac Dis 2019;11(7):2846-2860 / http://dx.doi.org/10.21037/jtd.2019.07.01, Jul. 2019, 15 pages.

Stearns et al; Efficacy of standard chest compressions in patients with Nuss bars; J Thorac Dis 2020;12(8):4299-4306 / http://dx.doi.org/10.21037/jtd-20-702, Aug. 2020, 8 pages.

Hsieh et al.; Journal of Cardiothoracic Surgery; Minimization of the complications associated with bar removal after the Nuss procedure in adults; 2020, 8 pages.

Nuss et al.; A 10-Year Review of a Minimally Invasive Technique for the Correction of Pectus Excavatum; Journal of Pediatric Surgery, vol. 33, No. 4 Apr. 1998: pp. 545-552; 8 pages.

Martinez-Ferro et al.; Non-surgical treatment of pectus carinatum with the FMF® Dynamic Compressor System; Journal of Visualized Surgery; Mar. 17, 2016, 8 pages.

Thomas et al.; Surgical Applications of Complaint Mechanisms: A Review; Journal of Mechanisms and Robotics; Apr. 2021, vol. 13; 13 pages.

Wahba et al.; A less intensive bracing protocol for pectus carinatum; Journal of Pediatric Surgery 52; (2017) 1795-1799, 5 pages.

Boia et al.; Determination of the Mechanical Requirements for a Progressive Correction System of Pectus Excavatum in Children; Journal of Laparoendoscopic & Advanced Surgical Techniques; vol. 15, No. 5, 2005, 4 pages.

Chang et al.; Preliminary analysis of the forces on the thoracic cage of patients with pectus excavatum after the Nuss procedure; Clinical Biomechanics 23 (2008) 881-885; 5 pages.

Sargent et al.; An Aggregate Sternal Force-Deflection Model; Journal of Biomechanical Engineering, Nov. 2023, vol. 145, Nov. 2023, 8 pages.

Grosen et al.; Postoperative consumption of opioid analgesics following correction of pectus excavatum is influenced by pectus severity: a single-centre study of 236 patients undergoing minimally invasive correction of pectus excavatum; European Journal of Cardio-thoracic Surgery 37 (2010) 833-839, 7 pages.

Chen et al.; Complex Regional Pain Syndrome Following the Nuss Procedure for Severe Pectus Excavatum; Ann Thorac Cardiovasc Surg., vol. 20, Supplement (2014); Feb. 15, 2013, 4 pages.

Fonkalsrud et al.; Force Required to Elevate the Sternum of Pectus Excavatum Patients; Oct. 2002, 3 pages.

Weber et al.; Forces to be overcome in correction of pectus excavatum; The Journal of Thoracic and Cardiovascular Surgery, vol. 132, No. 6; Dec. 2006, 5 pages.

Mattson et al.; Development of Commercially Viable Compliant Mechanisms Using the Pseudo-Rigid-Body Model: Case Studies of Parallel Mechanisms; 2001, 11 pages.

Howell et al.; The Development of Force-Deflection Relationships for Compliant Mechanisms; DE—vol. 71, Machine Elements and Machine Dynamics; Nov. 2001, 8 pages.

Rowland; Cardiopulmonary Exercise Testing in Children and Adolescents; 7 pages.

Krystofova, et al.; Bronchial Asthma and Obesity in Childhood; 2011, 5 pages.

Kravarusic, et al.; The Calgary Protocol for Bracing of Pectus Carinatum: A Preliminary Report; Journal of Pediatric Surgery (2006), 4 pages.

\* cited by examiner

ELASTIC BAR FOR PECTUS EXCAVATUM REPAIR

CROSS-REFERENCE TO RELATED APPLICATION

The present application claims priority to U.S. Provisional Patent Application Ser. No. 63/309,584, filed Feb. 13, 2022, the disclosure of which is expressly incorporated herein by reference.

BACKGROUND AND SUMMARY OF THE DISCLOSURE

The present application relates to an implantable medical device including stored energy and, more particularly to an elastic bar for use in pectus excavatum repair.

Compliant mechanisms have been favored over traditional rigid-link mechanisms in some engineering applications due to their low part count, stored strain energy, and simplicity/reliability. Such mechanisms offer potential for increased performance in medical applications, where patient safety is a priority, and where accessing a device after initial placement may be difficult, dangerous, and/or painful. Because of their stored strain energy, compliant mechanisms have the potential to perform their intended function in vivo, with little to no additional input from health professionals, greatly reducing risk and increasing patient satisfaction. They can be used in situations where self-correction (correction without any outside adjustment once the device is inserted) is desired or necessary. These benefits make compliant mechanisms an attractive alternative to correct a pectus excavatum deformity.

A phenomenon often called de-stiffening the chest wall has been observed in patients who have pectus carinatum (PC), or pigeon chest. PC is characterized by a deformed sternum that pushes outward, away from the internal organs in the chest cavity. PC is typically corrected through the use of external, wearable bracing devices. Before the correction process for PC begins, the chest wall has an in initial stiffness that opposes any displacement (like a coil spring). The phenomenon is observed once a constant force is applied to the chest wall by the brace; gradually and over time, the stiffness of the chest wall decreases, and the initial constant force then produces greater displacement. This phenomenon resembles stress relaxation in engineering materials.

The device of the present disclosure suggests that the chest wall de-stiffening phenomenon observed in PC patients will hold true for pectus excavatum patients. Pectus excavatum (PE), or funnel chest, is a deformity of the chest wall, characterized by a deformed sternum that typically produces a fist-sized depression in the chest cavity. It is the most common chest wall deformity, with a rate of 1:300/400 births. This condition can result in exercise intolerance, shortness of breath, and chest pain. It may also result in labored breathing during exercise and overall loss of stamina. The current practice to correct this deformity is called the minimally-invasive Nuss procedure (NP), in which a surgeon takes a stiff metal bar and weaves it through the patient's rib cage and underneath the sternum. The bar is bent to match the shape of the patient's rib cage and rotated into its final position inside the chest cavity. This procedure typically produces instant correction of the deformed sternum, which correction distance far surpasses the region of non-painful skeletal deformation. The bar is placed between the ribs in such a way that one rib on either side of the sternum provides a vertical support to the bar, and the reaction load from the displaced sternum is effectively shifted to the ribs. The ends of the bar are often sutured to the outer ribs in efforts to create a fixed connection between the bar and the patient's body, which helps prevent flipping and jostling of the bar.

Because the NP procedure typically produces complete and immediate correction, in many cases, it also causes extreme pain. Healthcare providers traditionally counteract this side-effect by prescribing opiates; because of the increased chance for opiate addiction, an alternative solution is desired. Additionally, some patients may entirely forgo the operation because of the anticipated pain following the operation.

The illustrative device of the present disclosure, or elastic bar, is comparable in size to the Nuss bar and is configured to be inserted into the patient's body using a similar procedure. The illustrative elastic bar reduces patient pain by extending the PE correction stage to a longer period of time through a more gradual correction.

According to an illustrative embodiment of the present disclosure, an elastic bar for pectus excavatum repair includes a first end portion, a second end portion in spaced relation to the first end portion, and a flexible center portion connecting the first end portion and the second end portion. The center portion is moveable from a first state to a second state, the center portion extending outwardly in a convex manner from the first end portion and the second end portion in the first state, and the center portion extending inwardly in a concave manner from the first end portion and the second end portion in the second state.

According to another illustrative embodiment of the present disclosure, an elastic bar for pectus excavatum repair includes a first end portion, a second end portion in spaced relation to the first end portion, and a flexible center portion connecting the first end portion and the second end portion. The center portion is moveable from a first state to a second state, the center portion extending outwardly from the first end portion and the second end portion in the first state, and the center portion extending inwardly from the first end portion and the second end portion in the second state. The first end portion and the second end portion each have a stiffness greater that the flexible center portion. The center portion is configured to deflect up to 40 millimeters from the first state to the second state.

According to a further illustrative embodiment of the present disclosure, a method of correction pectus excavatum includes the steps of providing an elastic bar including a first end portion, a second end portion in spaced relation to the first end portion, and a flexible center portion connecting the first end portion and the second end portion, and inserting the elastic bar within a chest cavity of a patient, wherein the first end portion and the second end portion engage opposing ribs of the patient, and the flexible center portion engages a sternum of the patient. The flexible center portion applies force against the sternum in an outward direction as the flexible center portion of the elastic bar moves from a concave position to a convex position.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
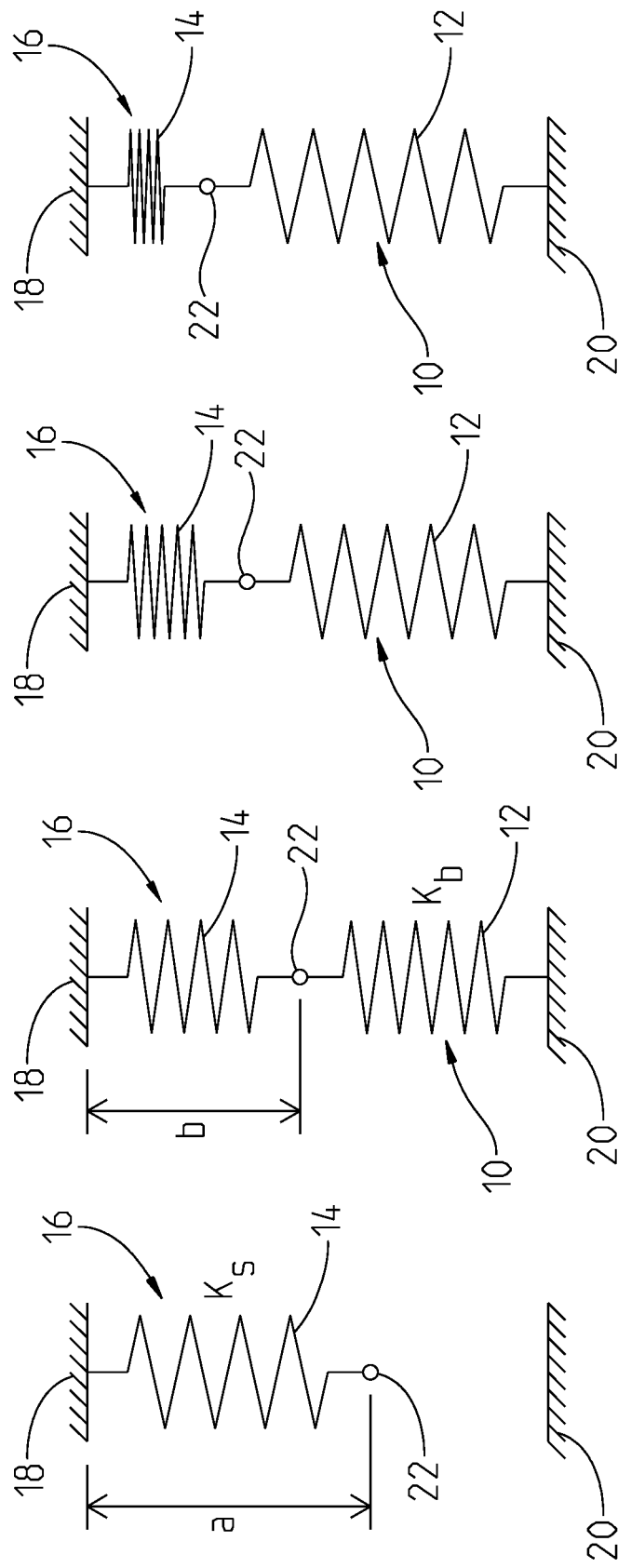
FIGS. 1A-1D are diagrammatic views of the mechanical principle behind the progression of an illustrative bar assembly to the present disclosure from before insertion to full correction of pectus excavatum.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Mechanical Principles

An illustrative elastic bar 10 of the present disclosure is configured to correct a pectus excavatum deformity in a human patient and do so in a gradual process. The mechanical principle behind the progression of the illustrative elastic bar 10 from before insertion to full correction (left to right) is illustrated in FIGS. 1A to 1D, respectively. The viewpoint is from the transverse plane of the patient's body. Springs 12 and 14 are represented by the bar 10 and a sternum 16 of a patient, respectively, and are connected in series and fixed at both ends. As such, there is an equilibrium point in between the springs 12 and 14. As the spring constant of the patient's chest wall decreases, and the spring constant of the elastic bar 10 remains unchanged, the equilibrium point will gradually move towards the fully corrected position.

With further reference to FIGS. 1A to 1D, the top fixed support 18 represents the fixed position of the chest wall, while the bottom fixed support 20 represents the elastic bar 10 being fixed to the patient's rib cage. Point 22 represents the contact point between the elastic bar 10 and the patient's sternum 16. The spring constant ($K_b$) of the bar 10 is unchanging (due to its material properties and design parameters), while the spring constant ($K_s$) of the sternum 16 is variable on the basis of the de-stiffening chest wall phenomenon. In FIG. 1A, the bar 10 is not yet positioned in the patient's body, and the chest wall has an initial stiffness and an initial equilibrium length (depending on the age, health, weight, race, sex, etc. of the patient). In FIG. 1B, the bar 10 is placed in the chest, and the two springs 12 and 14 move to their first equilibrium point. The difference between distances a and b (how far the equilibrium point travels when the bar 10 is first placed in the patient) is termed initial correction (IC); so IC=a−b. In FIGS. 1C and 1D, the chest wall gradually reduces in stiffness and a new equilibrium point achieved. Although this is shown in two discrete steps, the process takes place continuously at the same pace as the chest wall stiffness reduces.

The following description details the illustrative requirements which determine full, gradual correction of the pectus excavatum deformity; and the results of testing procedures are compared to these illustrative requirements after results are obtained.

1. The bar 10 can deform up to 40 mm without exceeding allowable stress.

2. The bar 10 will induce less than 20 mm of initial correction (IC) when first placed in the chest cavity of an adult.

3. The bar 10 will produce enough force to initially correct an fairly severe case (adult chest wall stiffness of 4.5 N/mm, 40 mm deformity depth) by 10 mm.

Chest wall stiffness data was taken from several literature sources, randomized and sorted by age. Through this process, approximate averages were created for three age groups for chest wall stiffness. This data is summarized in Table 1 below. While the chest wall is not linear in stiffness (instead following a high-order polynomial response), in the small deflection region, the linear assumption remains relatively accurate.

TABLE 1

The approximate average chest wall stiffnesses for different age groups.

| Grouping | Age (years) | Approximate Average Chest Wall Stiffness |
|---|---|---|
| Childhood | 0-10 | 2.635-3.162 N/mm |
| Adolescence | 11-18 | 2.66-3.204 N/mm |
| Adults | 18+ | 3.064-3.58 N/mm |

The elastic bar 10 is configured to be flexible enough to handle the depth of the patient's deformity without producing too much IC and without yielding, but also stiff enough to correct the sternum as completely as possible. A bar 10 that is too stiff will behave like the Nuss bar, while a bar 10 that is too flexible will not provide enough force to correct the sternum. The illustrative material used was Ti-6Al-4V (Ti-64) because of its biocompatibility and high strength to elastic modulus ratio.

The following concept has been designed based on a fictitious human patient with a moderately severe case of pectus excavatum (deformity depth of 40 mm) and worst-case chest wall stiffness of 4.5 N/mm. While this specific design with the final parameter value chosen in Table 2 may not apply to all patients, designing for extremely stiff chest walls is more limiting to compliant mechanism design and therefore, the proposed concept should easily adapt to the majority of cases.

Because the usability of the elastic bar 10 depends on predicting the stiffness of the bar 10, the analyses focus on the force-deflection behavior of the bar 10, while ensuring that the stress does not exceed the allowable stress. To evaluate the elastic bar's 10 performance, a comparison was performed using three different methods: analytical models, finite element analysis, and physical testing on full-scale prototypes.

Design Parameters

Figure 2:
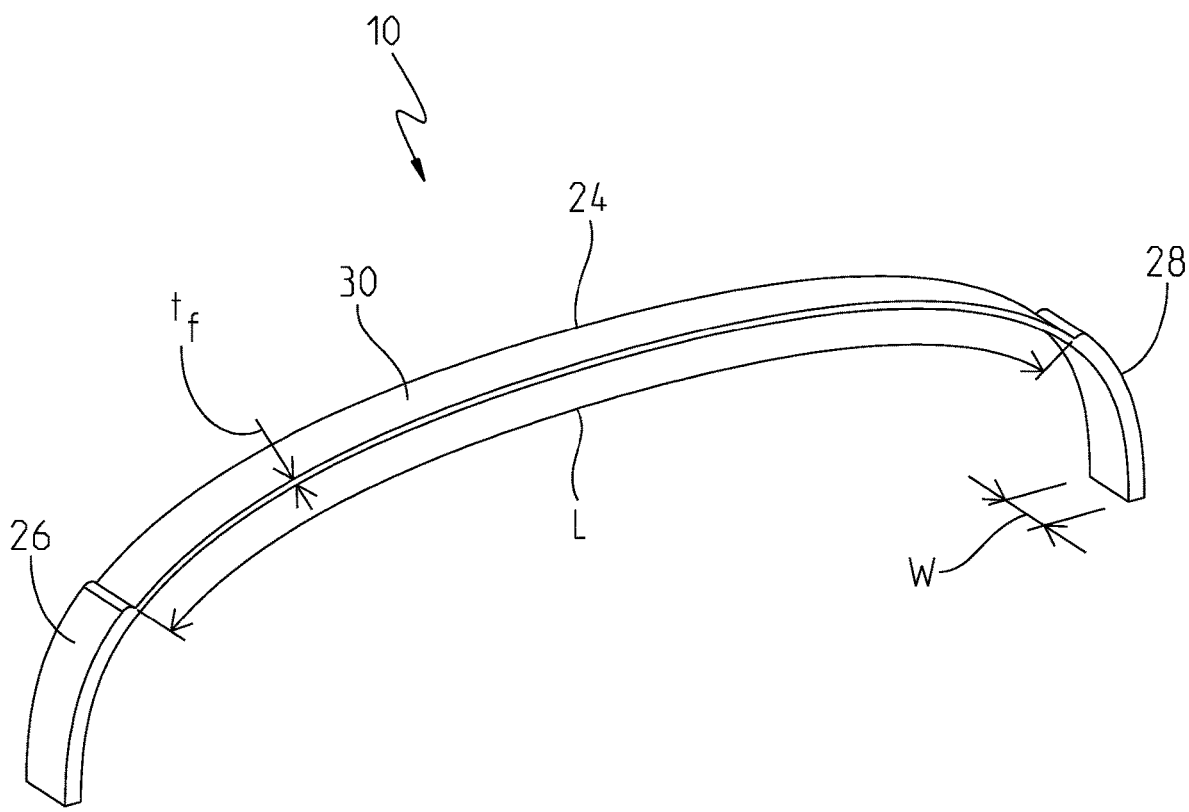
FIG. 2 is a perspective view of an illustrative elastic bar of the present disclosure.

The illustrative elastic bar 10 as shown in FIG. 2 includes a unitary body 24 having an arcuate shape. The body 24 is illustratively formed of a biocompatible material that meets the stiffness and yield strength requirements further detailed herein. In an illustrative embodiment, the elastic bar 10 is formed of a titanium alloy, such as Ti-64. The body 24 illustratively includes a first end portion 26 and a second end portion 28. The center portion 30 extends between the first end portion 26 and the second end portion 28. The elastic bar 10 illustratively retains overall dimensions similar to the Nuss bar, including the overall width, overall height, and overall length. However, the conventional Nuss bar has a constant cross section and corresponding uniform stiffness, while the illustrative elastic bar 10 includes flexible center portion 30. More particularly, the center portion 30 illustratively slims down in the middle to allow it to flex under the load of the sternum.

The parameters of the elastic bar 10 that may be adjusted by the designer are listed in Table 2 below. More particularly, these design parameters may be tuned for each patient (or for general groups of patients based on age, sex, build, etc.) to determine which stiffness is best for the patient based on the initial stiffness of their chest wall and the depth of their deformity. The curvature of the bar 10 is intended to match the curvature of the patient's healthy chest wall; so it is not a parameter the designer can adjust. FIG. 2 is a perspective view of the illustrative elastic bar 10, with certain design parameters labeled to correspond to those detailed in Table 2. With further reference to FIG. 2, W represents the width of the body 24 of the bar 10, $t_f$ represents the thickness of the flexible center portion 30 of the bar 10, and L represents the length of the arc length of the flexible center portion 30 of the bar 10.

TABLE 2

A description of the parameters that the designer may adjust depending on specific outputs desired from the bar 10 (which should be dictated by the needs of the patient). A list of the final values for the physical prototype are given, along with the illustrative minimum and maximum values for each parameter. Refer to FIG. 2 for a visual description of each variable.

| Parameter Name | Final Value (mm) | Limits (mm) | Design Purpose |
|---|---|---|---|
| Bar Width (w) | 13.6 | 5 < w < 13.6 | Adjust the restoring force of bar |
| Flexible Segment Thickness ($t_f$) | 1.5 | $0.5 < t_f < 3.5$ | Control the stress in the bar, adjust restoring force |
| Flexible Segment Arc Length (L) | 210.0 | L < 230 | Control the stress in the bar, adjust restoring force |

Modeling

To model the elastic bar 10, two different models were developed: a mirrored fixed-guided (MFG) model and an initially curve pinned-pinned (ICPP) model. Both models were created using the Pseudo-Rigid-Body modeling technique for predicting force-deflection behavior. The models include several assumptions.

It is assumed that the chest wall and sternum behave in the linear elastic region, meaning that, for modeling purposes, the reaction force produced by the sternum is linearly proportional to the amount of displacement it undergoes. It was additionally assumed that the elastic bar 10 does not experience creep or stress relaxation, at least not for the time period when it places an active restoring force on the sternum. A modulus of elasticity (E) of 107 GPa for Ti-64 was utilized.

MFG Model

For a mirrored fixed-guided (MFG) model, the flexible portion of the bar 10 was assumed to be straight, with no initial curvature. The curvature is slight, and the model assumes that excluding it is not highly significant.

It is assumed that the bar 10 is perfectly mirrored across the plane that travels parallel to its width (the body's sagittal plane); because of this symmetry, there is an equal and opposite reaction moment produced from both sides of the bar 10, creating a zero net moment at the center of the bar. These boundary conditions produce guided behavior (where the bar's center point translates only and does not rotate). With no net moment at the center of the bar 10, only half of the flexible portion of the bar 10 was analyzed (and the force was doubled to account for both sides of the bar 10).

This model requires a strong fixed connection; this could be achieved in vivo by suturing the rigid segments of the bar 10 to the rib cage. See FIGS. 3A and 3B for a visual representation of this model.

Figure 3A:
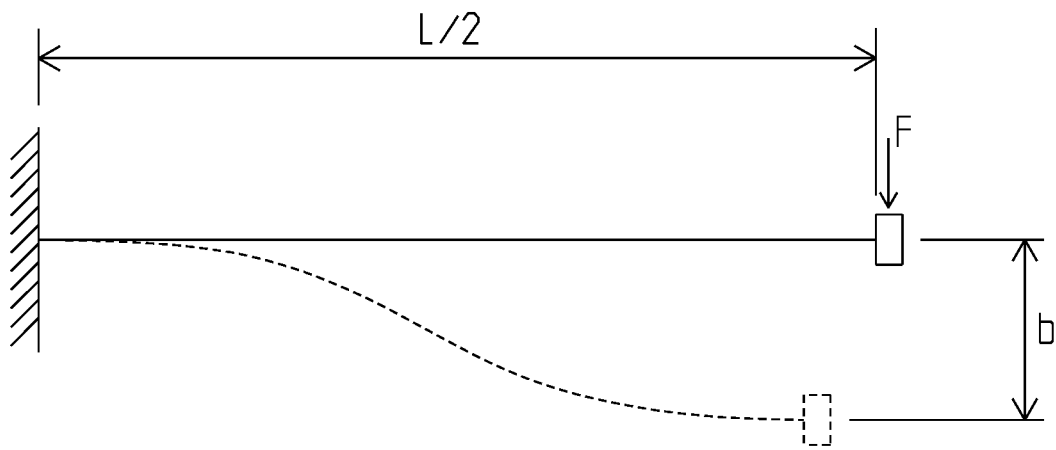
FIGS. 3A and 3B are diagrammatic illustrations of a mirrored fixed-guided (MFG) model of the elastic bar of FIG. 2.
Figure 3B:
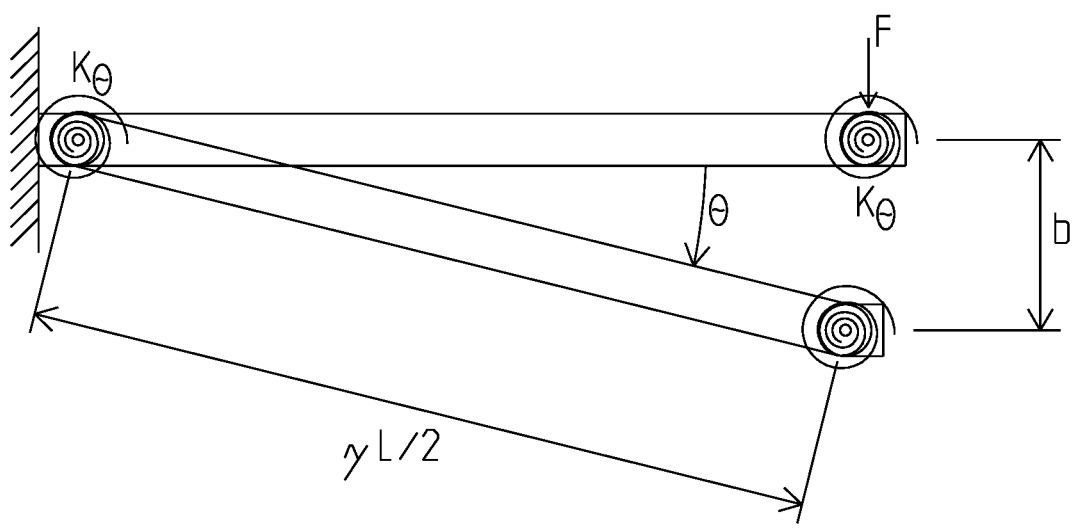

More particularly, FIGS. 3A and 3B illustrate the MFG model of the elastic bar 10. More particularly, FIG. 3A illustrates one half of the flexible segment of the bar 10 without an initial curvature, while FIG. 3B illustrates the pseudo-rigid-body model interpretation of the MFG bar 10. The solid lines represent the model in its initial position, while the broken lines represent the model after an arbitrary deflection. The fixed end on the left experiences both moment and force reactions. The right end of the bar 10 is allowed to translate in both directions, but cannot rotate. F represents the force of the displaced sternum on the bar 10.

ICPP Model

For the initially curved pinned-pinned (ICPP) model, it is assumed that the bar 10 is pinned at the ends, meaning that it can sustain a force reaction but no moment reaction. In the body, this boundary condition is achieved as the bar 10 is weaved through the rib cage and sits on top of the ribs. This uses the initially curved pinned-pinned Pseudo-Rigid-Body model but modified for the case of a load at the center point. This model allows us to analyze the whole bar 10 and account for the slight initial curvature. See FIGS. 4A and 4B for a visual representation of this model.

Figure 4A:
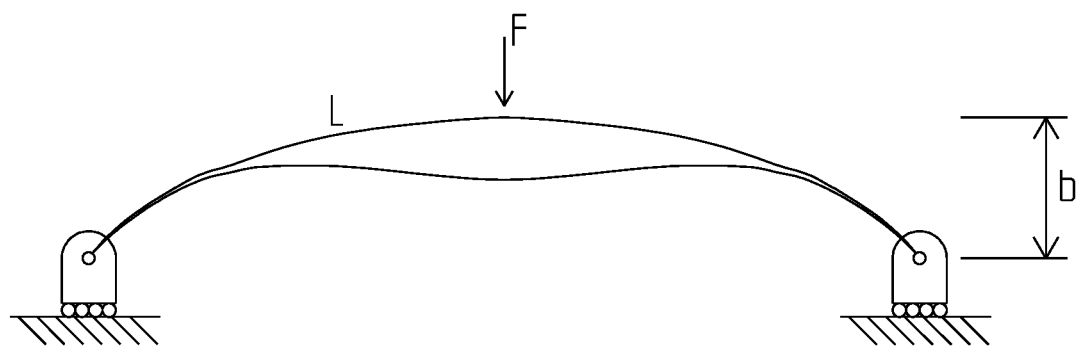
FIGS. 4A and 4B are diagrammatic illustrations of an initially curved pinned-pinned (ICPP) model of the elastic bar of FIG. 2.
Figure 4B:
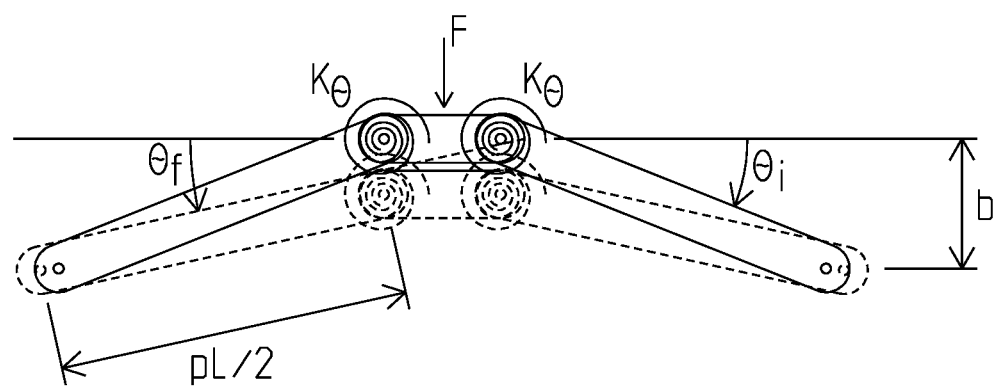

More particularly, FIGS. 4A and 4B are illustrations of an ICPP model of the elastic bar 10. More particularly, FIG. 4A illustrates the long flexible segment of the bar 10 without an initial curvature, pinned at both ends. FIG. 4B illustrates the pseudo rigid body model interpretation of the ICPP bar 10. The solid lines represent the model in its initial position, while the broken lines represent the model after an arbitrary deflection.

Analytical Models

The models and equations in the following section were developed using the Pseudo-Rigid-Body model and further adjusted for the specific boundary conditions. For the MFG model, the equations used to predict force are:

$$F = \frac{32 K_\Theta EI \Theta}{L^2 \cos \Theta} \quad (1)$$

Where:

$$\Theta = \sin^{-1}\left(\frac{2b}{\gamma L}\right) \quad (2)$$

and $\gamma$ is the characteristic radius factor, $K_\Theta$ is the stiffness coefficient, E is the modulus of elasticity of the material, I is the area moment of inertia about the bending axis, L is total arc length of the flexible segment, $\Theta$ is the pseudo rigid body angle, and b is the vertical displacement of the bar 10.

For the ICPP model, the equations use to predict force are:

$$F = \frac{4K(\Theta_i - \Theta_f)}{\rho L \cos(\Theta_i - \Theta_f)} \quad (3)$$

where:

$$K = \frac{2\rho K_\Theta EI}{L} \quad (4)$$

and:

$$\Theta_f = \sin^{-1}\left(\frac{2b}{L\rho}\right) \quad (5)$$

and $\rho$ is the pseudo-rigid link length parameter, $K_\Theta$ is the stiffness coefficient, E is the modulus of elasticity of the material, I is the area moment of inertia about the bending axis, L is the length of the flexible segment, and b is the vertical displacement of the bar 10. Additionally, $\Theta_f$ is the final pseudo rigid link angle after deflection and $\Theta_i$ is the pseudo rigid link angle based on the initial curvature of the bar 10.

For both of the models, the force-deflection relationship is calculated using a process which inputs an array of b values which correspond to an array of $\Theta_f$ (or $\Theta$ for the MFG model) values, which is then used to calculate the output force for each input displacement.

Finite Element Analysis (FEA) Simulation

A static structural FEA simulation was performed using ANSYS 2021 to verify the results of the analytical models for the boundary conditions used in both the MFG and ICPP models. The element mesh sizing was 1 mm³ for both models.

To replicate the MFG boundary conditions, a fixed support was added to one side, while the other side was left free. A displacement load in steps of 4 mm was placed on the center of the bar 10, and the center of the bar 10 was constrained to remain vertical (i.e., no rotation was allowed), as illustrated in FIG. 5.

Figure 5:
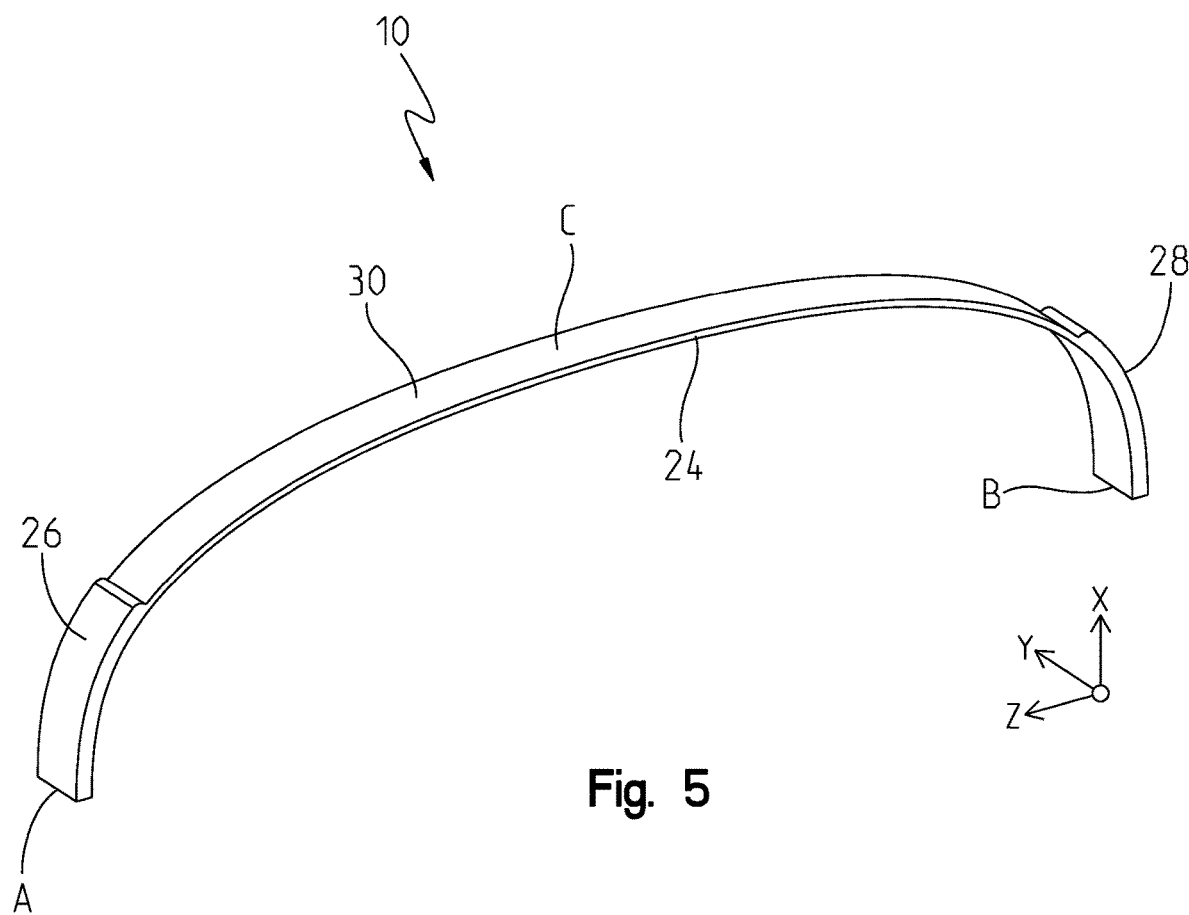
FIG. 5 is a diagrammatic view illustrating boundary conditions of a finite element analysis (FEA) simulation of the MFG model of FIGS. 3A and 3B.

More particularly, FIG. 5 illustrates the boundary conditions for the FEA simulation of the MFG model. At marker A, there is a fixed condition on the bottom face of the bar 10 (fixed in all directions and rotations). At marker B, the face is fixed in the X direction, but free in Y and Z directions. A marker C, there is a displacement applied in steps of 4 mm in the negative X direction while the Y and Z directions remained free.

To replicate the ICPP boundary conditions, the left side of the bar 10 was constrained in all directions, while the other side was constrained in the vertical and out-of-page directions but allowed to move in the horizontal direction. A displacement load in steps of 4 mm was applied to the center of the beam. These boundary conditions are illustrated in FIG. 6.

Figure 6:
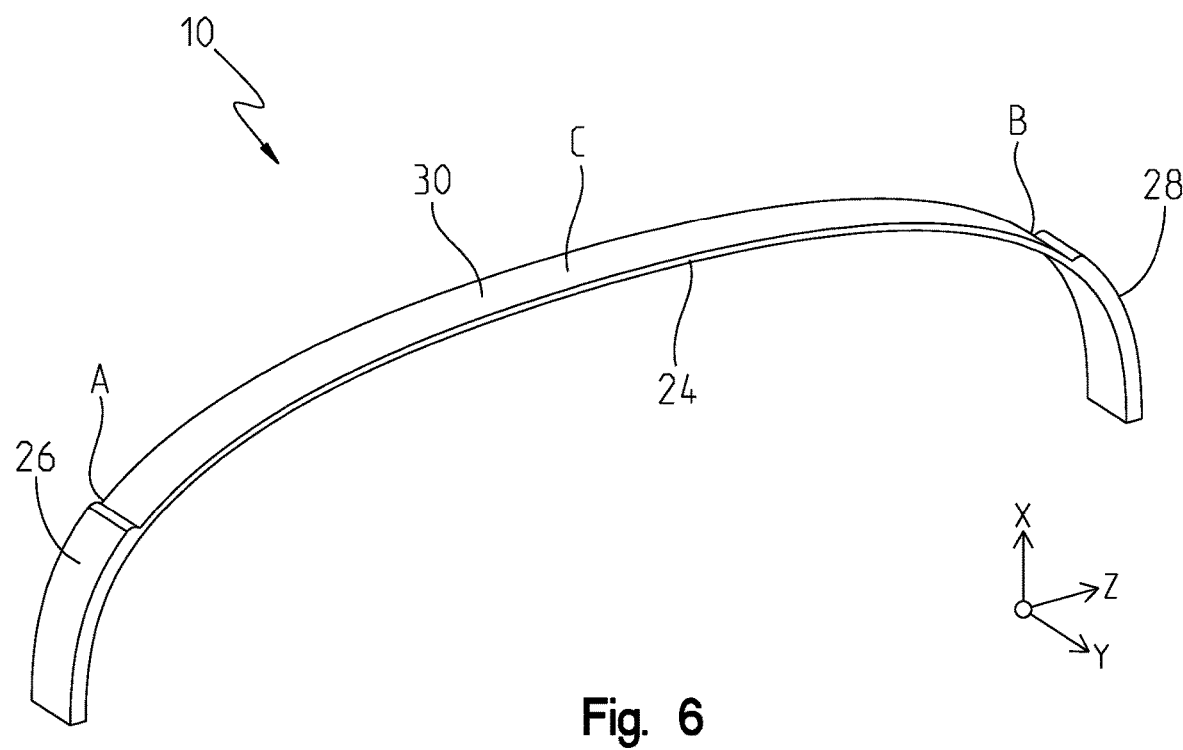
FIG. 6 is a diagrammatic view illustrating boundary conditions of an FEA simulation of the ICPP model of FIGS. 4A and 4B.

More particularly, FIG. 6 illustrates the boundary conditions for the FEA simulation of the ICPP model. At marker B, the edge shown is fixed in the X direction, but free in Y and Z directions. At marker A, the edge opposite of the edge used for marker B is fixed in all directions. A marker C, there is a displacement applied in steps of 4 mm in the negative X direction while the Y and Z directions remained free.

Physical Prototype

Figure 7:
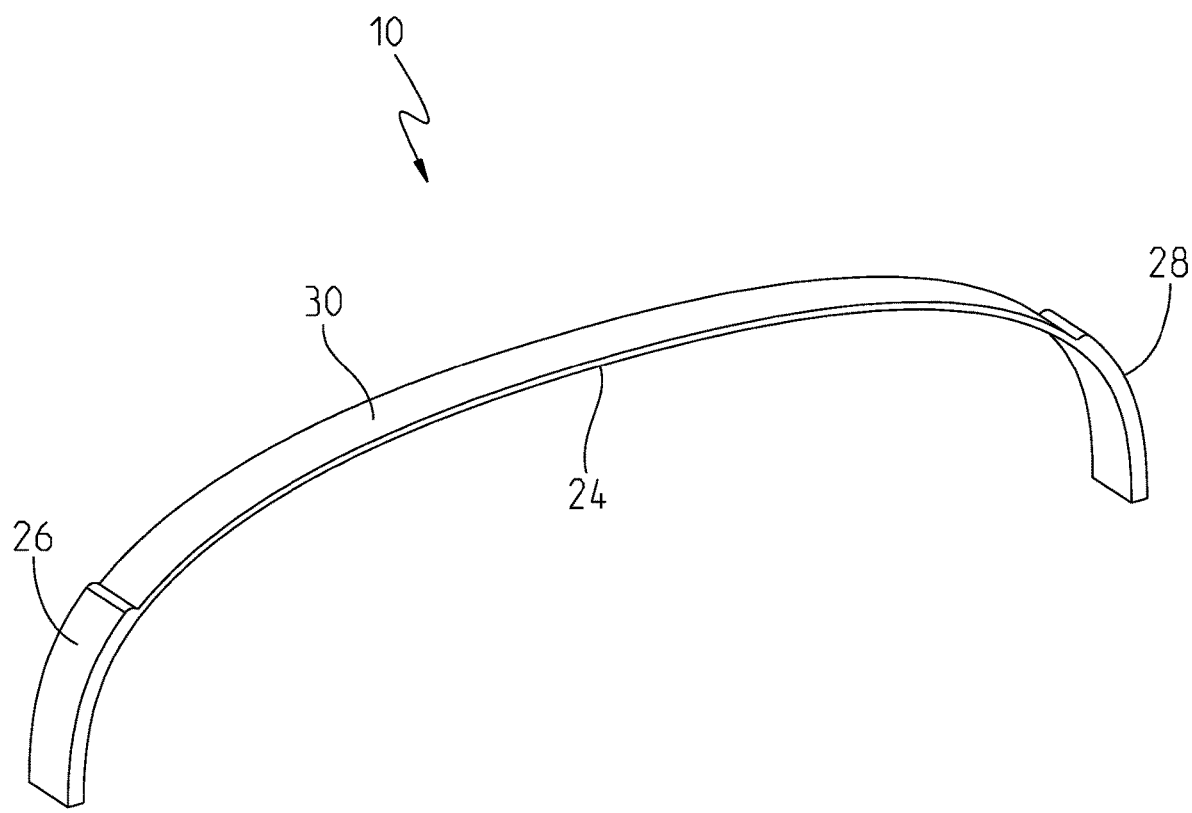
FIG. 7 is another perspective view of the elastic bar of FIG. 2.

FIG. 7 further illustrates the Ti-64 prototype of the elastic bar 10. Again, illustrative dimensions of this bar 10 are provided in Table 2 above. The bar 10 was fabricated from Ti-64 using wire-EDM manufacturing techniques. It was then manually sanded and polished. The bar 10 was placed on a custom-designed test rig 40 (FIGS. 8A and 8B), and force-deflection data was gathered using a force sensor (illustratively, model Nidec-Shimpo FG-3006, which has a resolution of 0.1 N and accuracy of ±0.3% FS), video feed, and a ruler. The camera feed showing displacement and force sensor output were aligned to produce the desired force-deflection data.

Figure 8A:
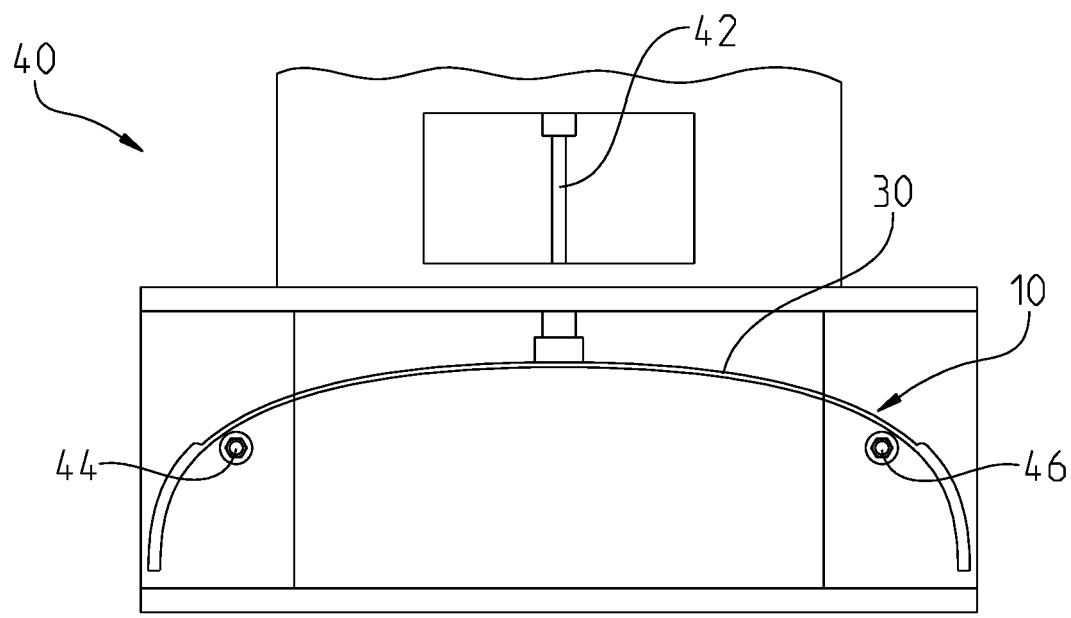
FIG. 8A is a side elevational view of the elastic bar of FIG. 7 in a test rig before deflection.
Figure 8B:
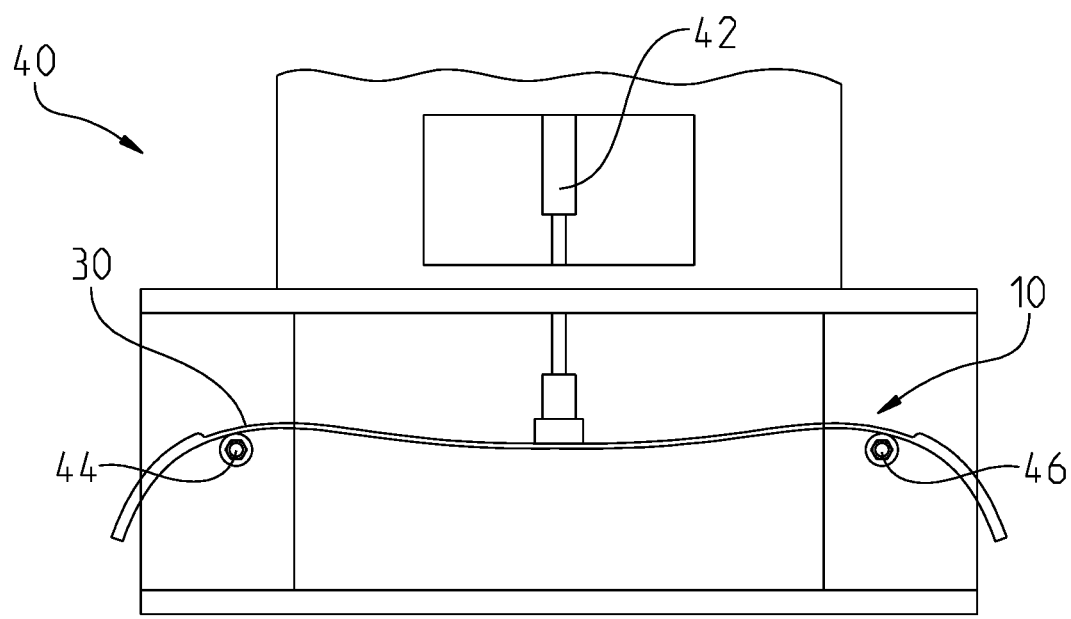
FIG. 8B is a side elevational view similar to FIG. 8A during a deflection test.

FIGS. 8A and 8B illustrate the prototype elastic bar 10 in the test rig 40 at different times during a deflection test. More particularly, FIG. 8A illustrates the titanium elastic bar 10 in the test rig 40 before any deflection occurs. FIG. 8B illustrates the titanium elastic bar 10 in the test rig 40 during a deflection test. The test rig 40 was made from aluminum, 3D printed PLA parts, and machined acrylic. This test rig 40 represents the ICPP modeling technique. The force gauge (not shown) advances downwards using a simple, manually-actuated lead screw 42 wherein the bar 10 is supported between support rods 44 and 46.

The ICPP boundary conditions were used to test the physical prototype because those conditions are the most likely to be used in an implant for correcting pectus excavatum.

Figure 9:
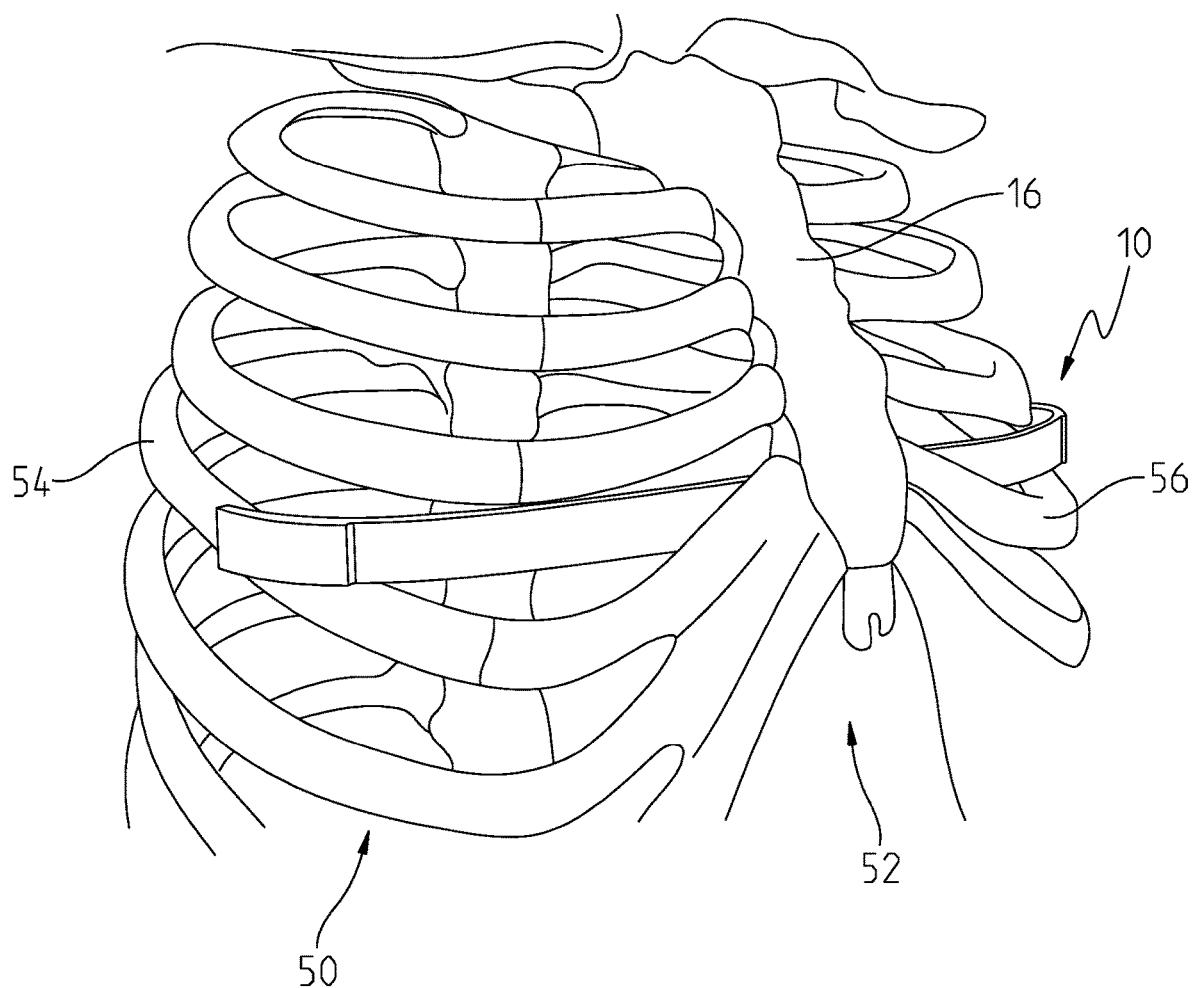
FIG. 9 is a perspective view showing the elastic bar of FIG. 2 placed within a skeletal model of a human rib cage.

FIG. 9 illustrates the elastic bar 10 placed in a skeletal model of a human rib cage 50. More particularly, FIG. 9 shows the relative position of the bar 10 in a patient's chest cavity 52, wherein opposing ribs 54 and 56 approximate pinned supports.

Results

Figure 10:
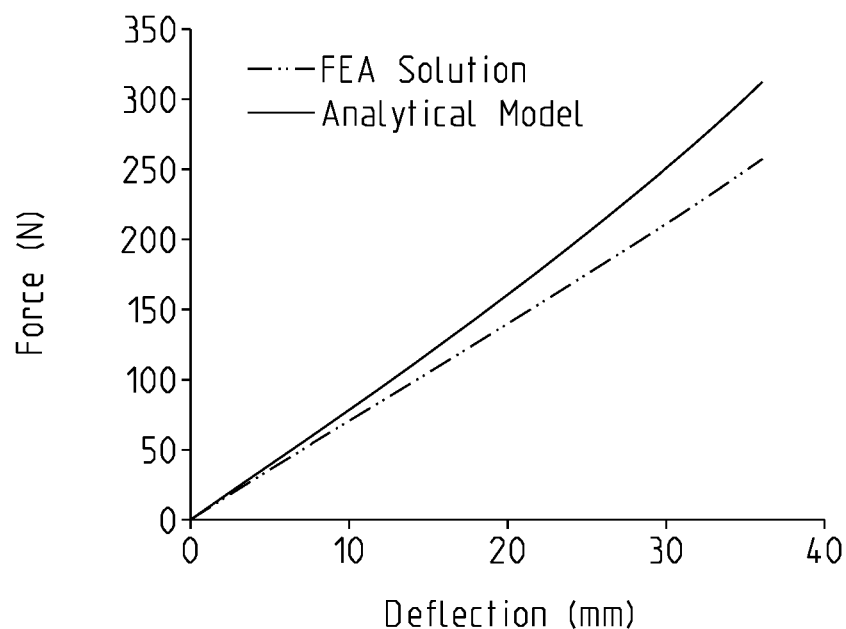
FIG. 10 is a graph illustrating a comparison of the analytical model and FEA for the MFG model.
Figure 11:
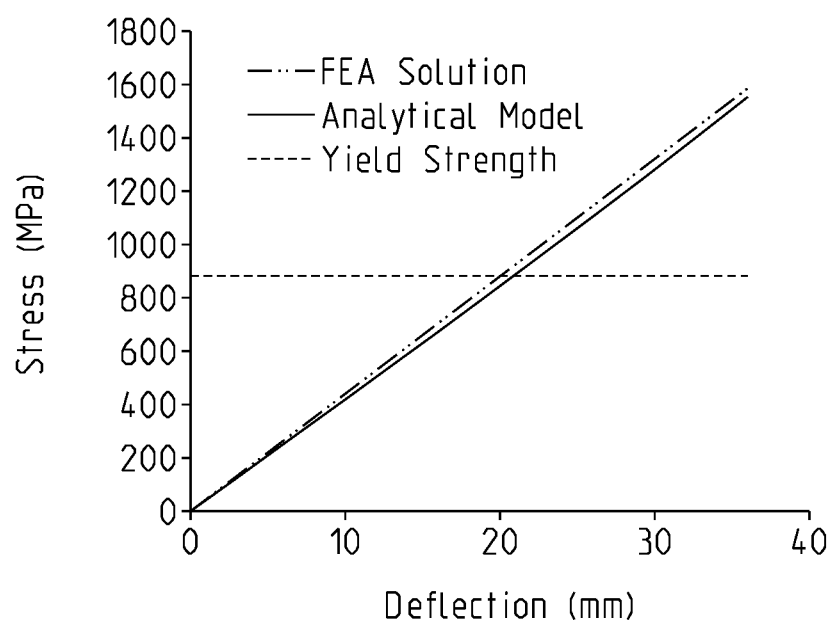
FIG. 11 is a graph illustrating the stress in the elastic bar of FIG. 2 using the MFG model.
Figure 12:
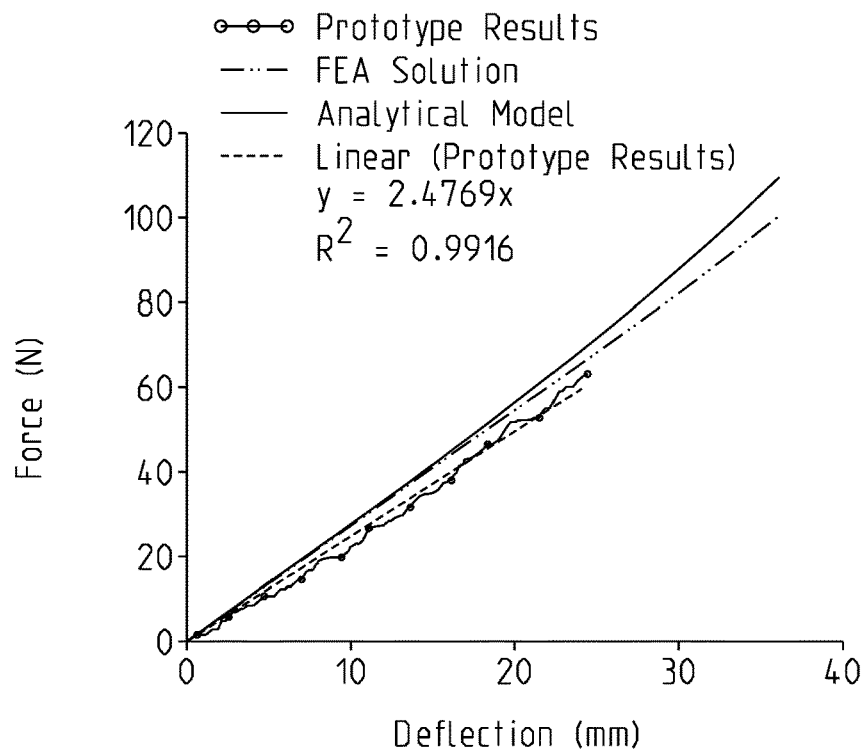
FIG. 12 is a graph illustrating the comparison of the three illustrative methods (analytical models, FEA and physical prototype) for the ICPP model, with the linear fit applied to the physical prototype data.
Figure 13:
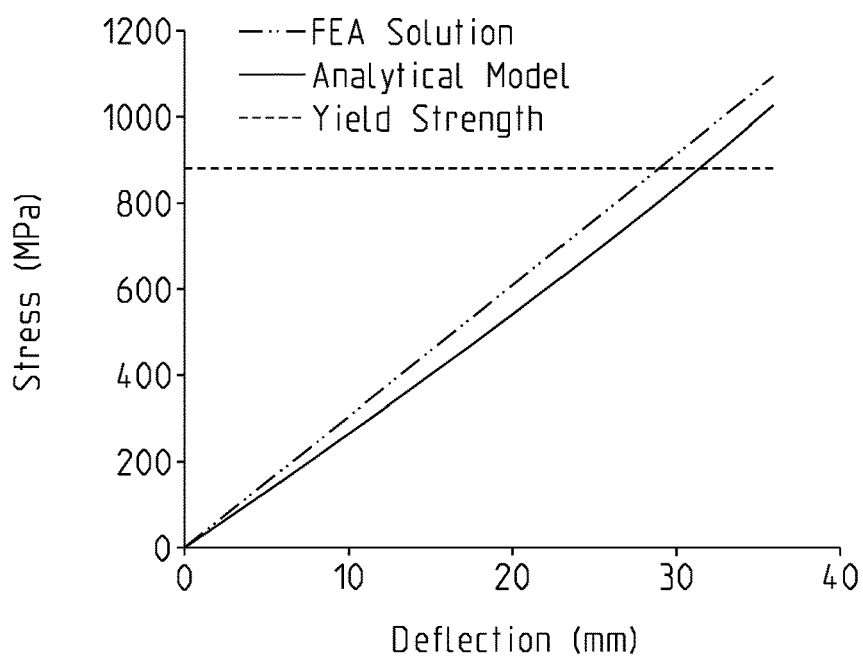
FIG. 13 is a graph illustrating stress in the elastic bar of FIG. 2 using the ICPP model.

The force-displacement relationship for each of the verification methods is presented in FIGS. 10 and 12, and the stress-displacement relationships are shown in FIGS. 11 and 13. More particularly, FIG. 10 illustrates the comparison of the analytical model and FEA for the MFG model. FIG. 12 is a plot of the comparison of all three methods (analytical models, FEA, and physical prototype) for the ICPP model, wherein a linear fit was applied to the physical prototype data. FIG. 11 is a plot of the stress in the bar 10 using the MFG model, and FIG. 13 is a plot of the stress in the bar 10 using the ICPP model.

For the MFG data, the average percent error of the force between the FEA and analytical model (the FEA was assumed to be the theoretical value) was 13.77% with a standard deviation of 6.17%. Similarly, the average percent error for the stress was 4.37% with a standard deviation of 2.40%. FIG. 10 shows that the analytical model and the FEA model begin to deviate at larger deflections.

For the ICPP data, the average percent error of the force between the FEA and analytical model (the FEA was again assumed to be the theoretical value) was 3.63% with a standard deviation of 3.13%. Similarly, the average percent error for the stress was 10.37% with a standard deviation of 5.03%.

Experimental results were obtained by testing the prototype hardware with the ICPP loading condition. When comparing between the prototype and the analytical model, the average percent error was 11.11% with a standard deviation of 5.08%. When comparing between the prototype and the FEA model, the average percent error was 10.56% with a standard deviation of 4.97%. Additionally, the slope the regression line in FIG. 12 (i.e. the stiffness of the prototype elastic bar) is 2.4769 N/mm.

SUMMARY

The modeling techniques used and detailed above were verified to be accurate. The ICPP model better matches the actual boundary conditions present in the body and accounts for the slight curvature in the bar. This model produced greater accuracy, with the FEA and analytical models agreeing to within about 3%. The agreement between the physical prototype and the FEA/analytical models for the ICPP remains relatively constant, at about 10%. In FIG. 12, the model is shown to be initially good at predicting performance, but, as the bar 10 deflects away from the equilibrium position, this accuracy decays. A possible cause for this inaccuracy is the bar's 10 change of inflection. Initially, the bar 10 has negative concavity until it reaches about 20 mm of vertical deflection, where the flexible segment of bar 10 is rendered essentially horizontal. Further deflection after this point places the bar 10 in a state of positive concavity where it can continue to deflect for another 20 mm or so. Although the original Pseudo-Rigid-Body model was not intended to account for changes in concavity, it is promising that the model can predict the behavior as well as it does even after the change of inflection.

The mechanical design of the bar 10 itself was also good, although there are drawbacks. The bar 10 may not reach the fully correct position because its restoring force drops as deflection decreases. This can be addressed by designing the bar 10 to have an equilibrium shape which is the shape of an over-corrected chest wall. Then, when the bar 10 is in the chest cavity 52 and does not have enough force to move to its equilibrium shape, it will stop short of that shape and be in the shape of a fully corrected chest wall.

Further, under extreme circumstances, such as deformity depths exceeding 50 mm or chest wall stiffnesses above 5 N/mm, the bar 10 may not be able to fully reach the deformity depth while remaining in the elastic deformation region, or will produce a large IC in the patient.

To determine the overall success of the bar 10, further reference is made to the three illustrative requirements stated above. On the first requirement, from FIG. 13, it is observed that the bar 10 can undergo 30 mm of deflection before surpassing its yield strength. Although this does not match the desired 40 mm deflection, it should be stated that this deformity depth can easily be attained by simply decreasing the flexible segment thickness ($t_f$). This thinning would produce less force, and the bar width (w) could be increased to compensate.

On the second requirement, and for the fictitious patient described earlier, the bar 10 will produce 14.2 mm of IC of the chest wall. This assumes the spring constants behave in the linear region, which assumption is accurate in small deflections.

Based on the mechanical principle represented in FIG. 1, the equation used to calculate IC is:

$$IC = \frac{aK_b}{K_s + K_b} \tag{6}$$

where $\alpha$ is the initial deformity depth, $K_b$ is the stiffness of the bar, $K_s$ is the stiffness of the sternum. Because this bar 10 was designed for the worst-case stiffness, it will produce greater IC in patients who have less stiff chest walls. The bar 10 can be easily modified (by adjusting the design parameters in Table 2) to avoid high amounts of IC in these lower stiffnesses.

The bar 10 also achieves the force needed to initially correct beyond 10 mm, satisfying the third requirement. Additionally, the biocompatibility of the bar 10 is guaranteed with the use of the selected material Ti-64, and the process of placing the bar 10 in the chest cavity is also verified because it is similar to the Nuss placement procedure.

Based on the test results, the elastic bar 10 meets the requirements outlined above and therefore is capable of correcting the pectus excavatum deformity using a gradual process (correction which happens slowly over a long period of time).

The elastic bar 10 is shown to be effective as a corrective medical device for pectus excavatum which is able to correct the deformity over time. Analytical models, FEA, and a physical prototype show that the bar 10 can undergo a large deflection to account for the PE deformity and, at the same time, can deliver enough restoring force to substantially correct PE. There exists good agreement between the analytical model, FEA, and physical prototype especially for the ICPP model.

This principle of gradual self-correction could find further application in other medical bracing/implants by using compliant mechanisms to induce stress relaxation in the body. Examples include pectus carinatum braces, scoliosis, and orthodontia.

Figure 14:
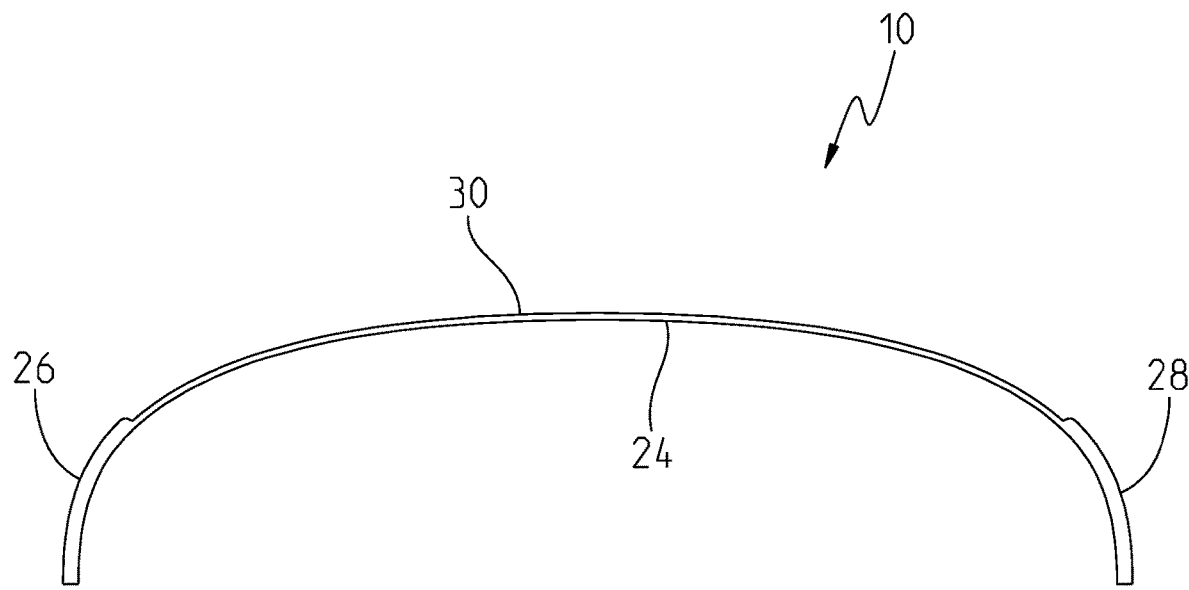
FIG. 14 is a side elevational view of the elastic bar of FIG. 7, with a center portion shown in an undeflected state.
Figure 15:
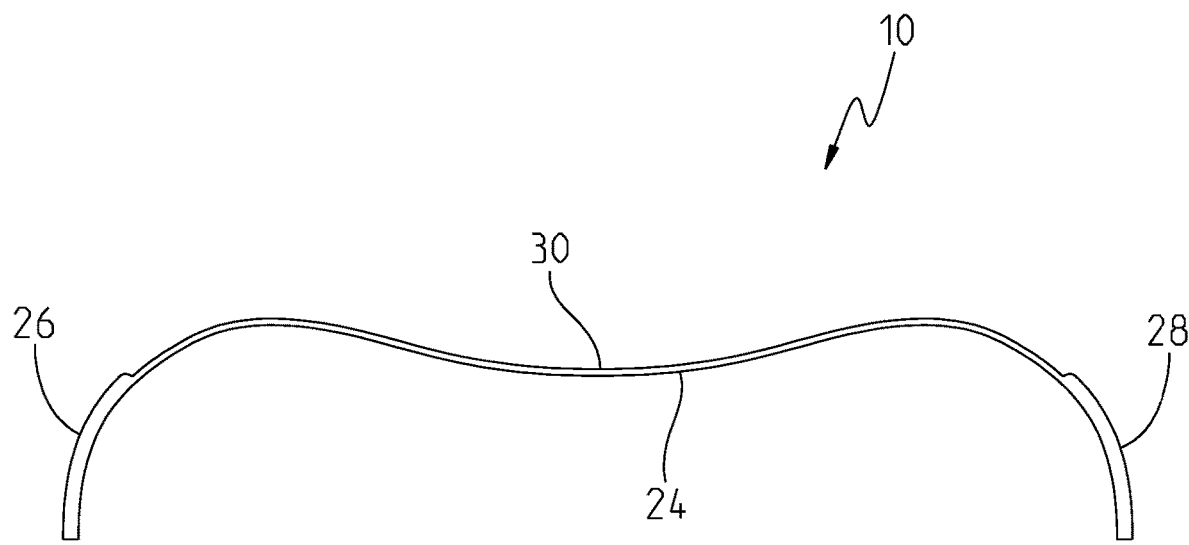
FIG. 15 is a side elevational view similar to FIG. 14, with the center portion shown in a deflected state.

FIGS. 7, 14 and 15 further illustrate the elastic bar 10, including opposing first and second end portions 26 and 28, and flexible center portion 30. The end portions 26 and 28 are configured to perform a stabilization function, while the center portion 30 is configured to perform a correction function. In one illustrative embodiment, the end portions 26 and 28 have a stiffness greater than the center portion 30. This may be accomplished by the center portion 30 having a material composition different from the end portions 26 and 28. Alternatively, and as further detailed above, the center portion 30 may have a thickness less than that of the end portions 26 and 28. Illustratively, the center portion 30 and the end portions 26 and 28 may be integrally formed as a unitary body formed of a biocompatible material, such as a titanium alloy (e.g. Ti-64).

FIG. 14 illustrates the bar 10 in a first or undeflected state, while FIG. 15 illustrates the bar 10 in a second or deflected state. The illustrative center portion 30 may deflect up to 40 millimeters between a convex shape in the first state to a concave shape in the second state.

Figure 16:
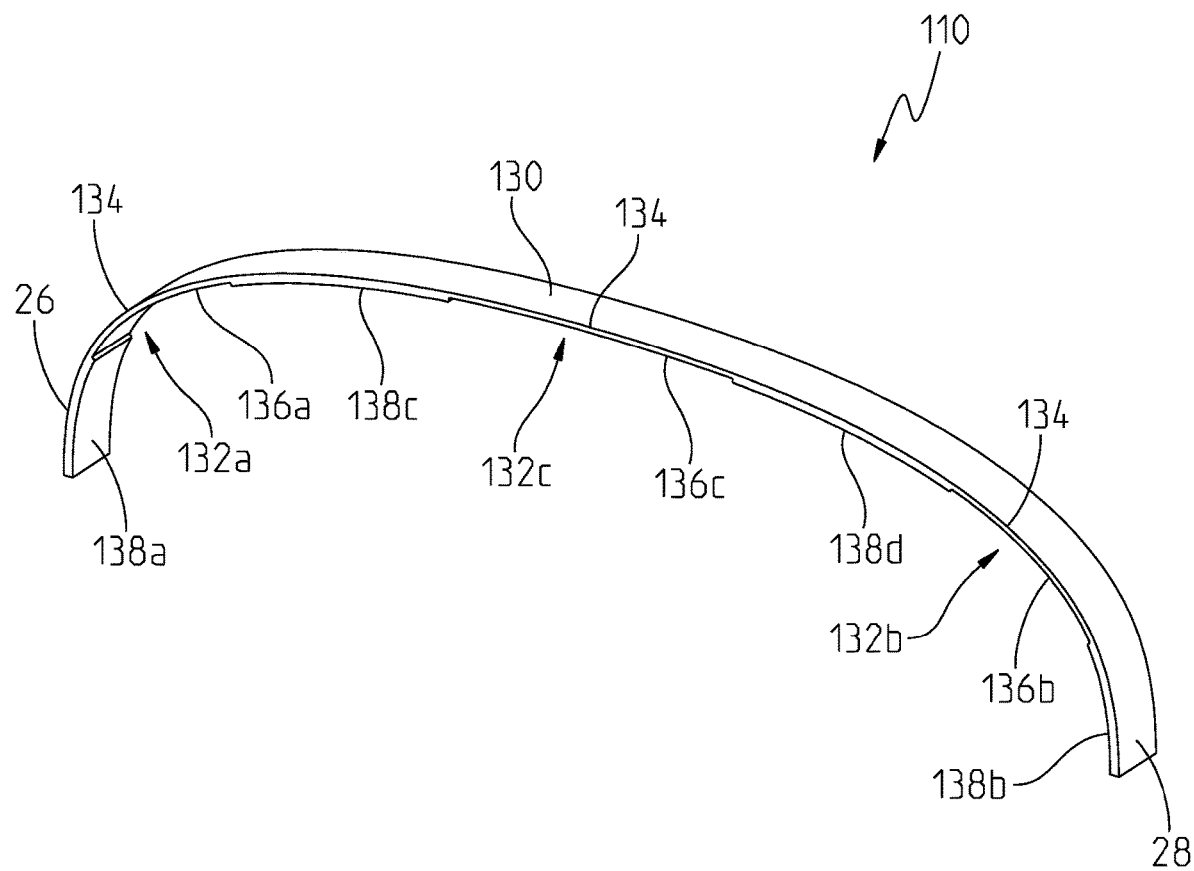
FIG. 16 is a perspective view of a further illustrative elastic bar of the present disclosure.
Figure 17:
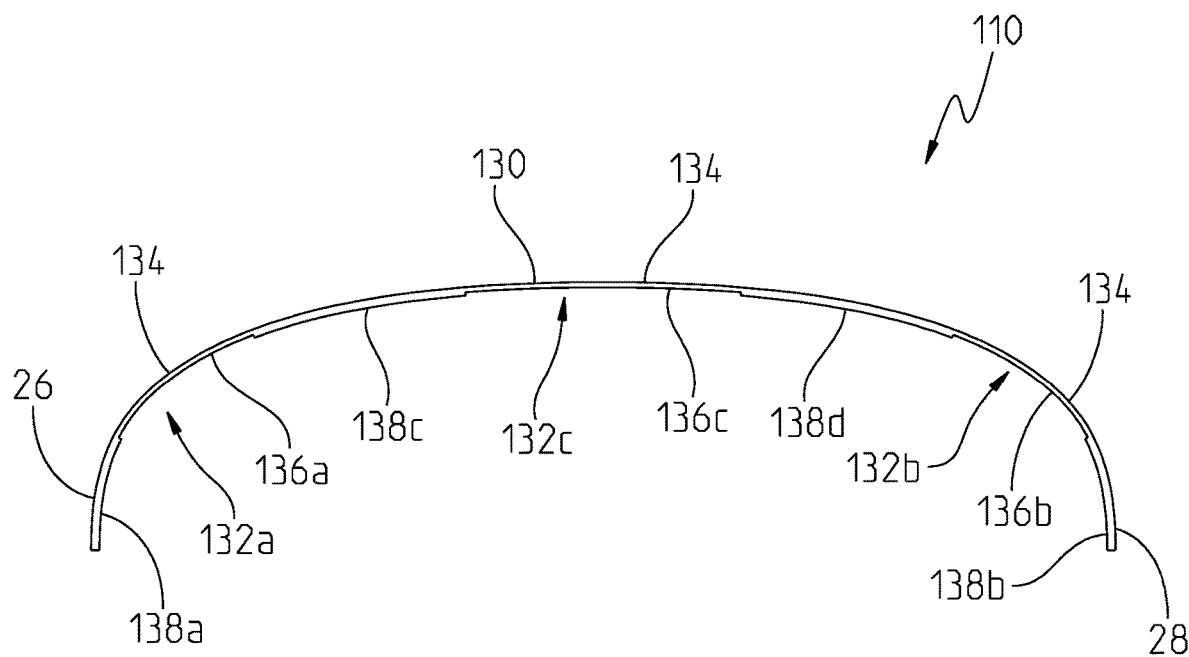
FIG. 17 is a side elevational view of the elastic bar of FIG. 16, with a center portion shown in an undeflected state.
Figure 18:
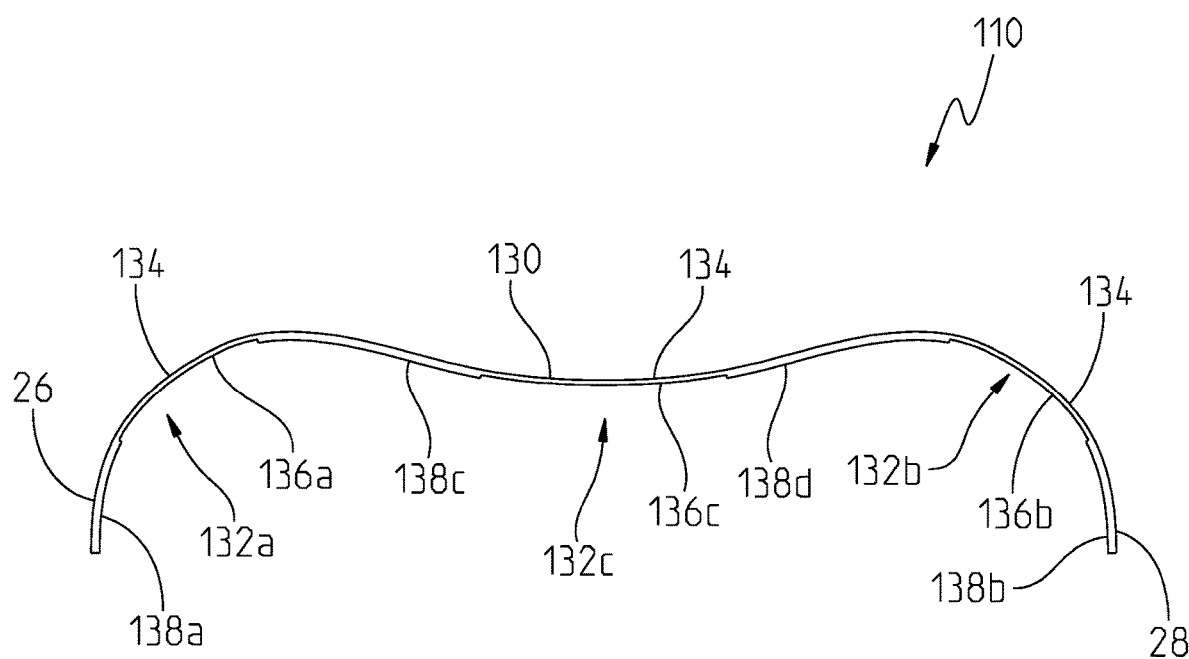
FIG. 18 is a side elevational view similar to FIG. 17, with the center portion shown in a deflected state.

FIGS. 16-18 illustrate a further illustrative embodiment elastic bar 110 including many of the similar elements of the elastic bar 10 as detailed above. As such, in the following description similar features are identified with like reference numbers.

The elastic bar 110 includes opposing first and second end portions 26 and 28. A flexible center portion 130 illustratively extends between the end portions 26 and 28, and includes a plurality of regionally compliant flexural pivots 132. Illustratively, first and second and pivots 132a and 132b are positioned on opposite sides of a center pivot 132c. These pivots 132 illustratively comprise small length flexural pivots 134 defined by thin connectors 136 (e.g., living hinges) extending between rigid, thicker segments 138. Alternatively, the pivots 132 could comprise lamina emergent torsional joints.

In an illustrative embodiment, a first end thin connector 136a extends between a first end rigid segment 138a and a first center rigid segment 138c, and a second end thin connector 136b extends between a second end rigid segment 138b and a second center rigid segment 138d. Illustratively, a center thin connector 136c extends between the first center rigid segment 138c and the second center rigid segment 138d. It should be appreciated that the number and placement of the thin connectors 136 and associated pivots 132 may vary.

Figure 19:
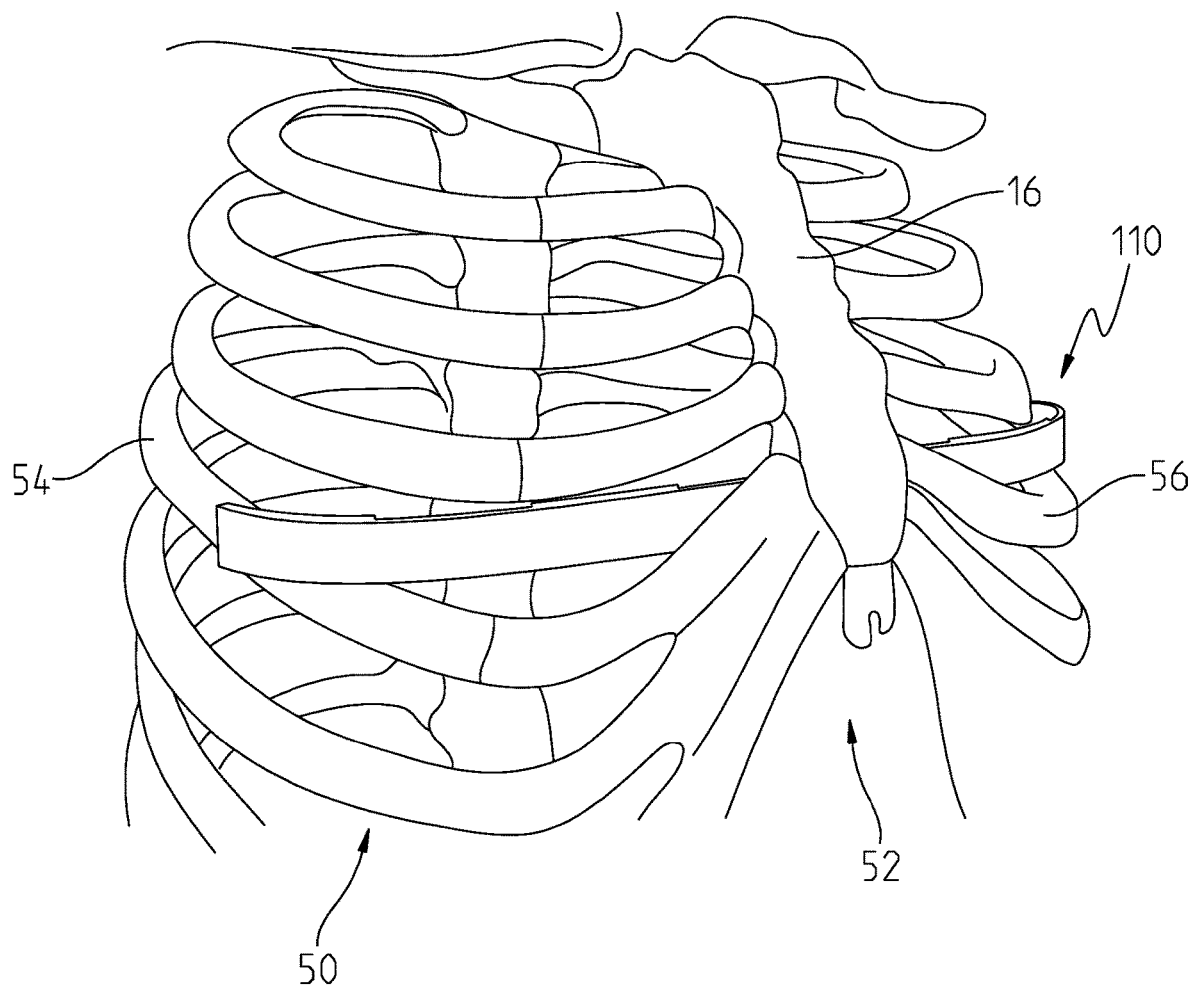
FIG. 19 is a perspective view showing the elastic bar of FIG. 16 placed within a skeletal model of a human rib cage.

FIG. 17 illustrates the bar 110 on a first or undeflected state, while FIG. 18 illustrates the bar 110 in a second or deflected state. The illustrative center portion 130 may deflect between a convex shape in the first shape to a concave shape in the second shape. FIG. 19 illustrates the elastic bar 110 placed within a skeletal model of a human rib cage 50, with the bar 110 shown in the relative position in a patient's chest cavity 52, and the ribs 54 and 56 approximate pinned supports.

Figure 20:
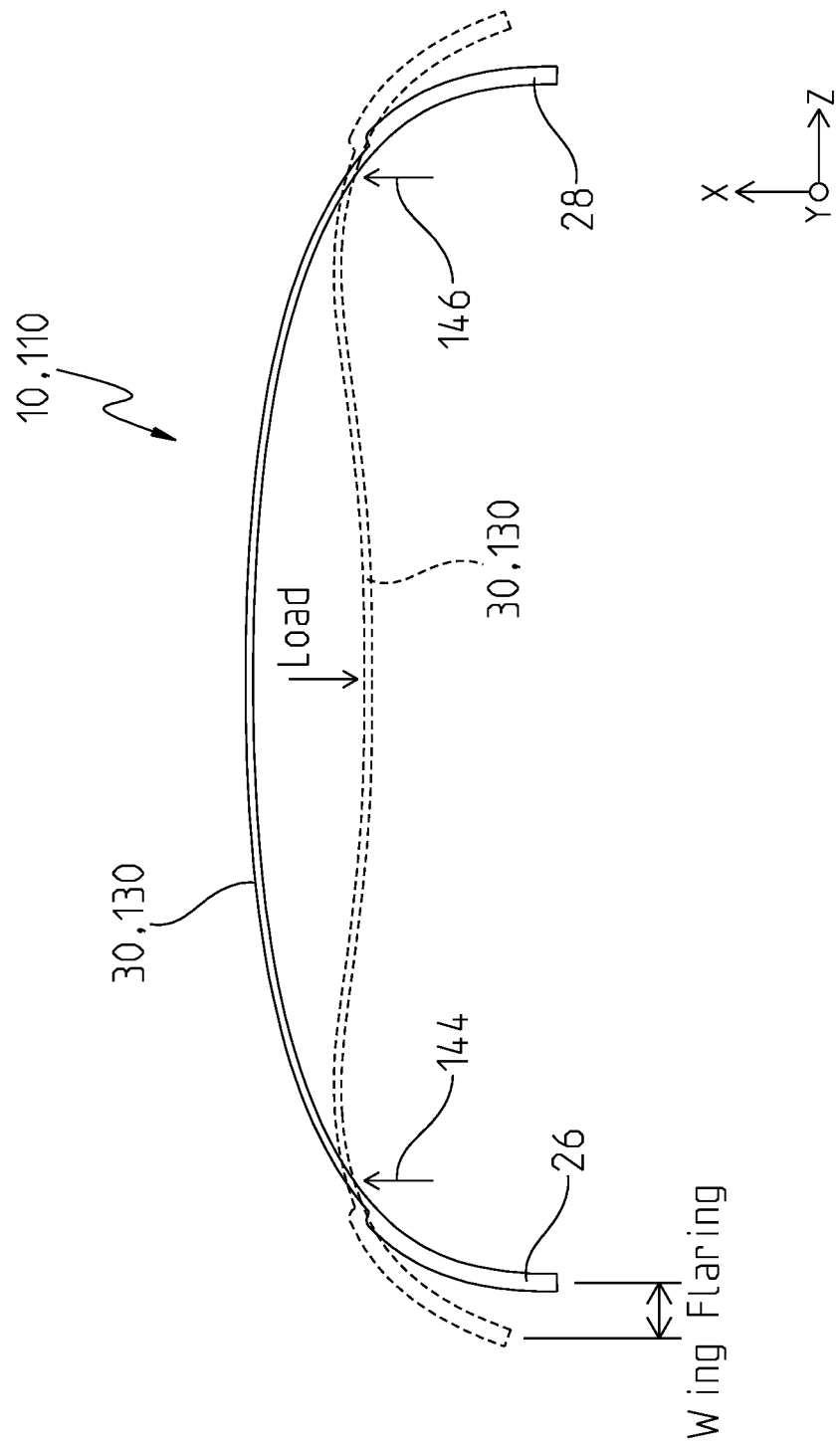
FIG. 20 is a diagrammatic illustration of wing flaring via an FEA demonstration.

FIG. 20 is a diagrammatic illustration of wing flaring via an FEA demonstration. More particularly, wing flaring is a deflection phenomenon in three-point bending. Wing flaring is a measure of how much deflection occurs at free ends of bars. With respect to the elastic bar 10, 110, loading of the center portion 30, 130 may cause the lateral end portions or wings 26 and 28 to flare outwardly. In FIG. 20, the bar 10, 110 may deflect relative to rib support points 144 and 146 between an undeflated state (shown as solid line) and a deflated state (shown in hidden line).

Figure 21:
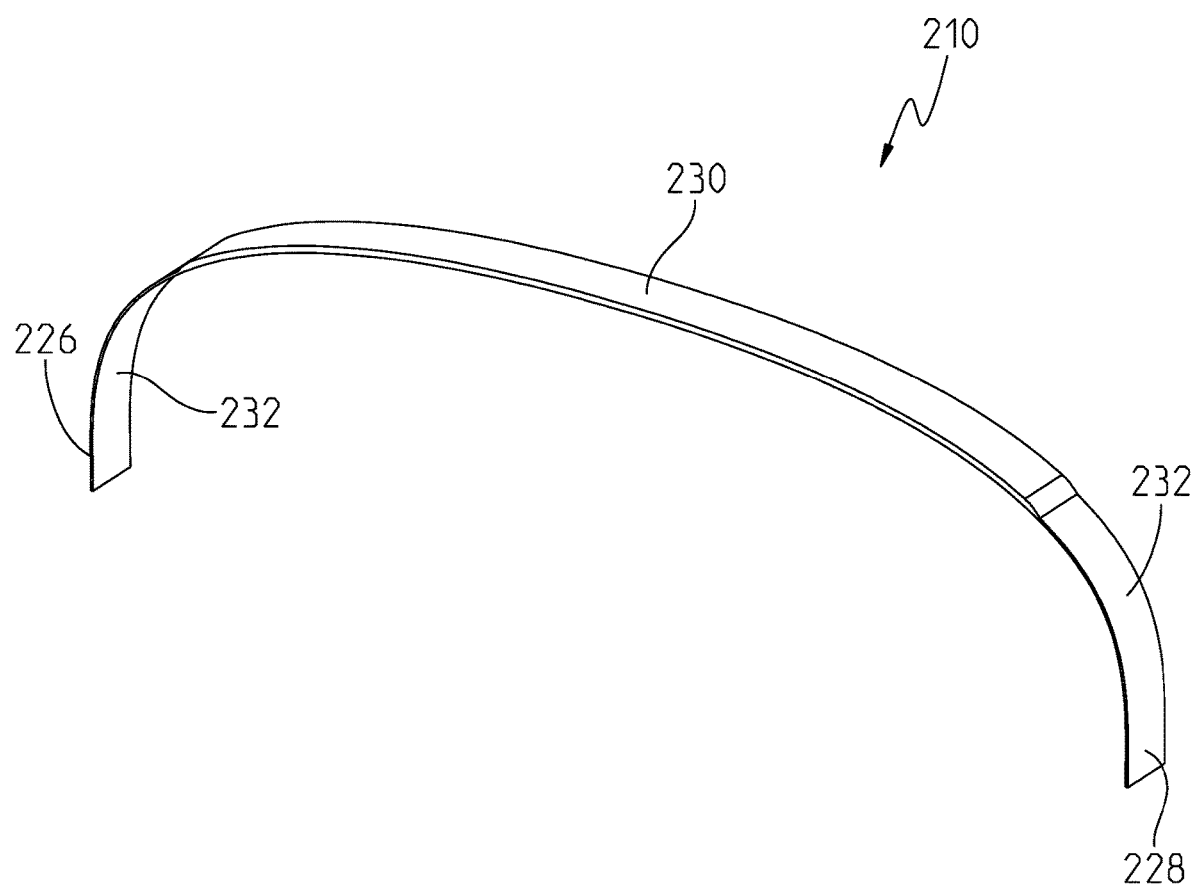
FIG. 21 is a perspective view of a further illustrative elastic bar of the present disclosure.
Figure 22:
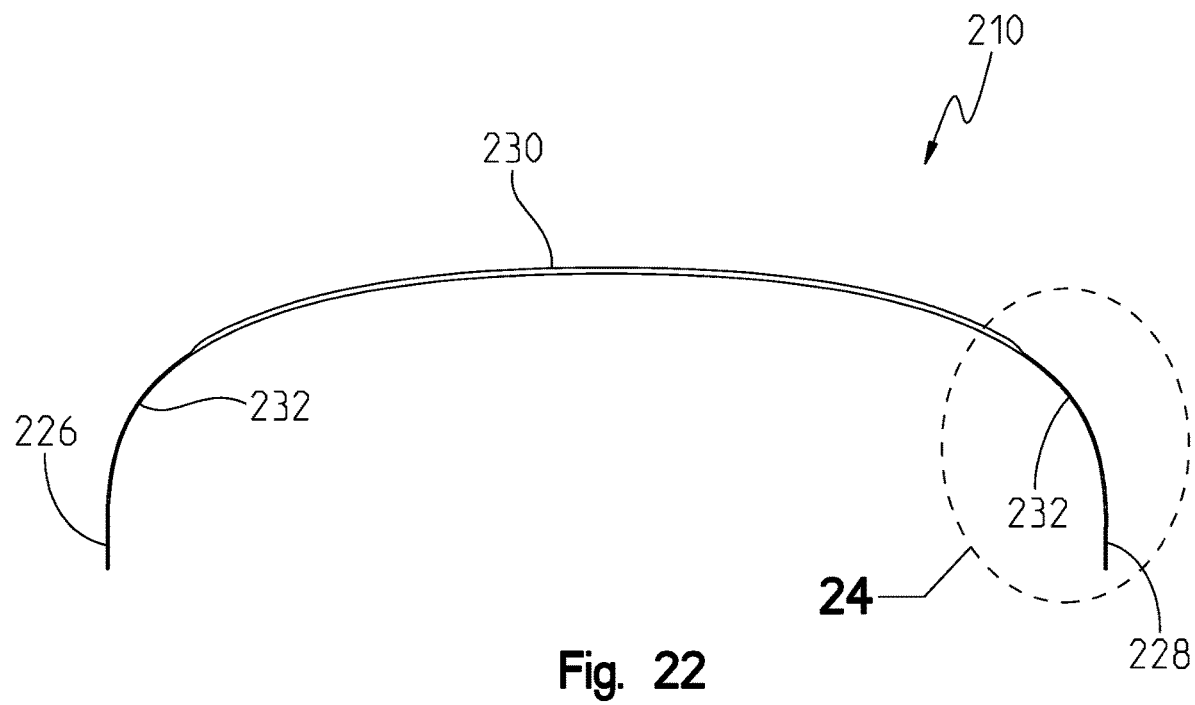
FIG. 22 is a side elevational view of the elastic bar of FIG. 21, with a center portion shown in an undeflected state.
Figure 23:
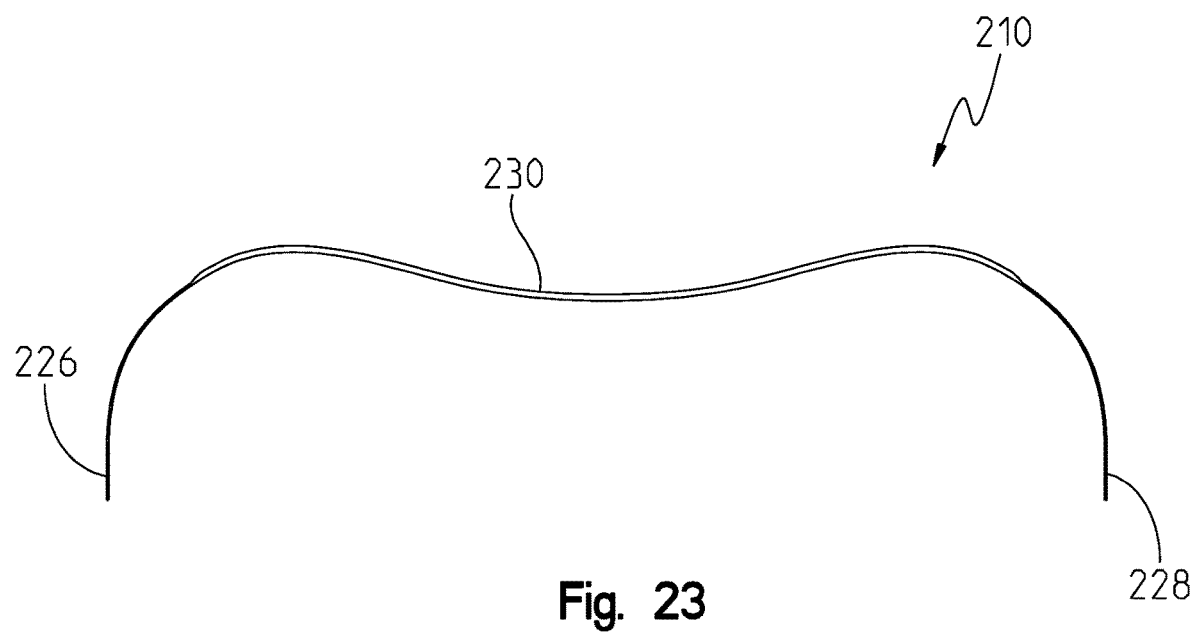
FIG. 23 is a side elevational view similar to FIG. 22, with the center portion shown in a deflected state.

FIGS. 21-23 illustrate a further illustrative embodiment elastic bar 210 including many of the similar elements of the elastic bar 10 as detailed above. As such, in the following description similar features are identified with like reference numbers.

Figure 24:
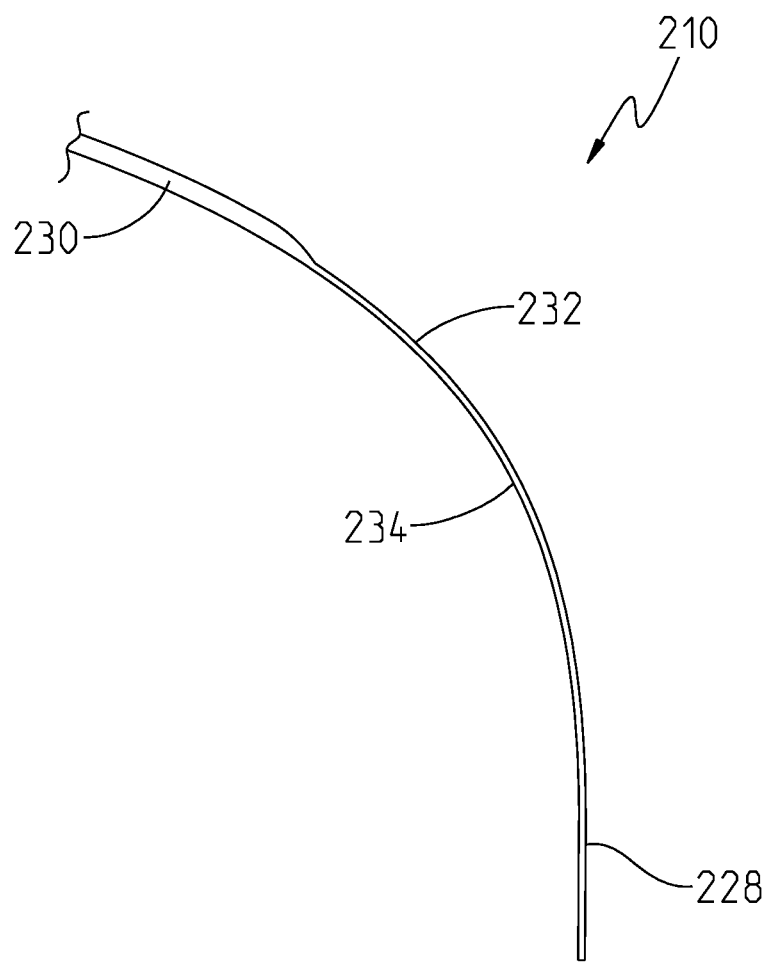
FIG. 24 is a detail view taken along line 24 of FIG. 22.

The elastic bar 210 includes opposing first and second end portions 226 and 228. A flexible center portion 230 illustratively extends between the end portions 226 and 228. The first and second end portions 226 and 228 include flaring reduction elements 232. More particularly, the flaring reduction elements 232 illustratively include thinned wings 234 to increase flexibility of the end portions 226 and 228, and thereby reduce undesired outward flaring of the end portions 226 and 228 (FIG. 24).

Figure 25:
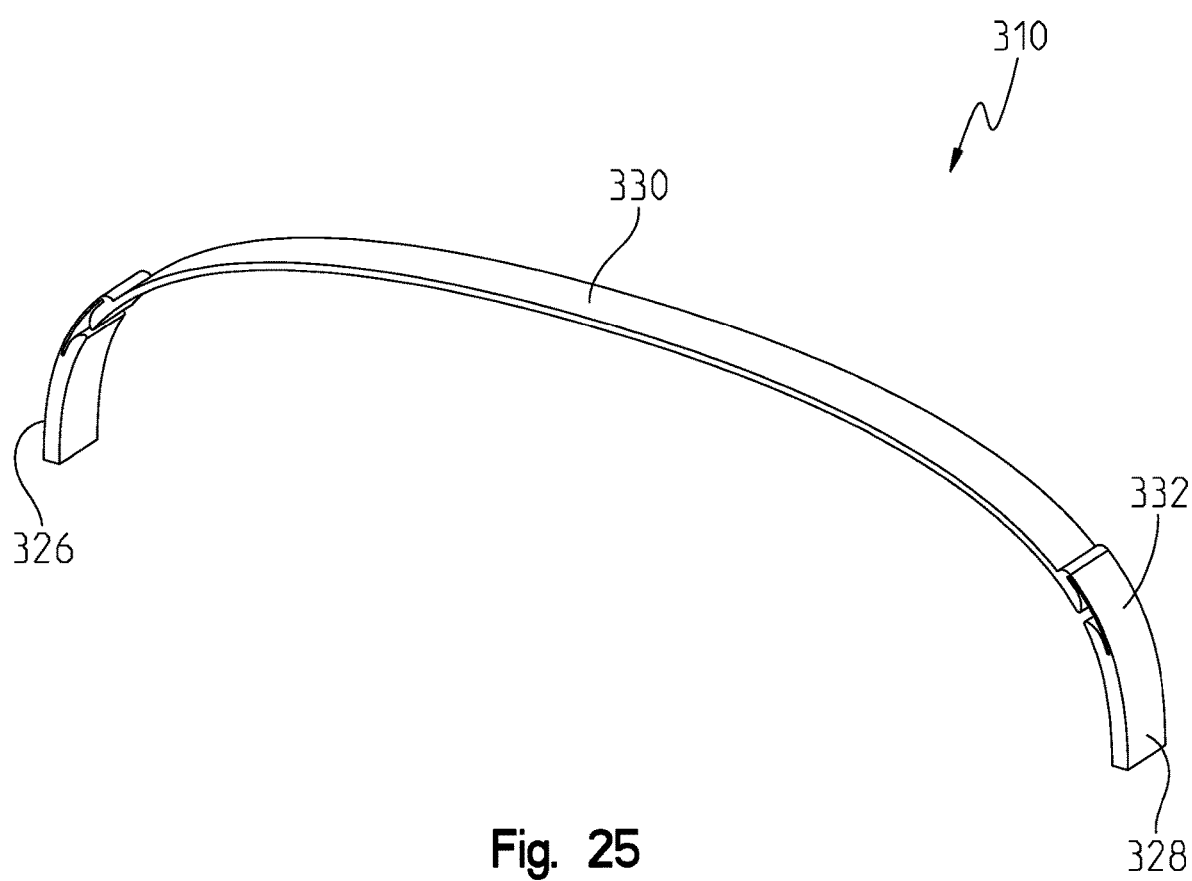
FIG. 25 is a perspective view of a further illustrative elastic bar of the present disclosure.
Figure 26:
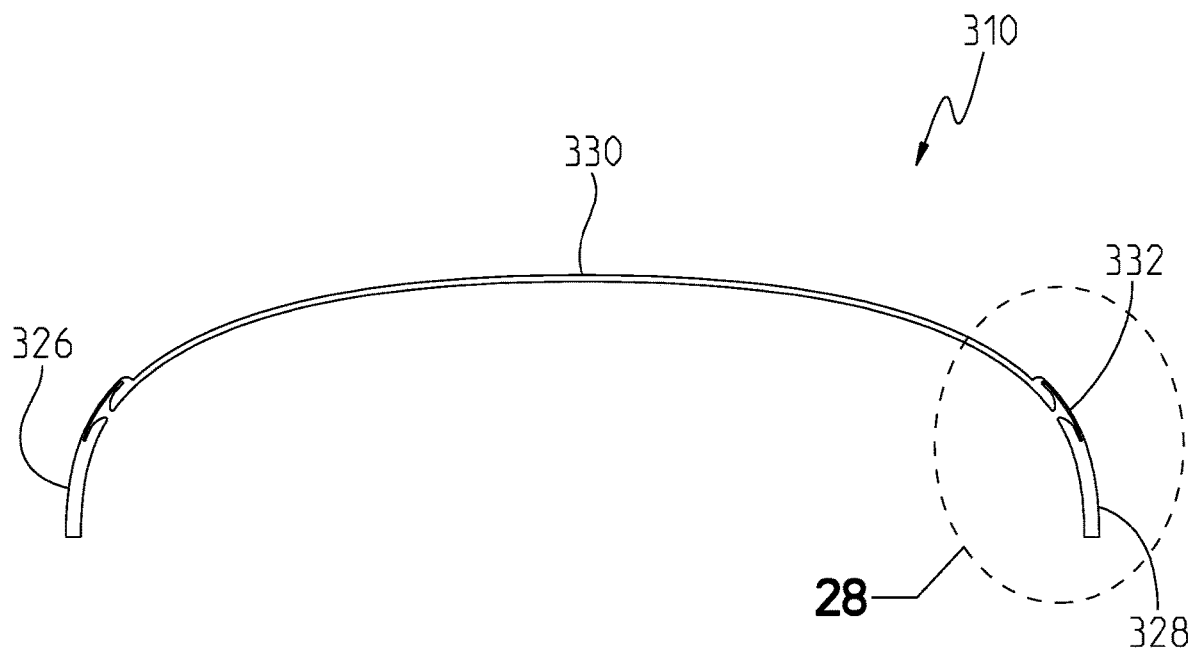
FIG. 26 is a side elevational view of the elastic bar of FIG. 25, with a center portion shown in an undeflected state.
Figure 27:
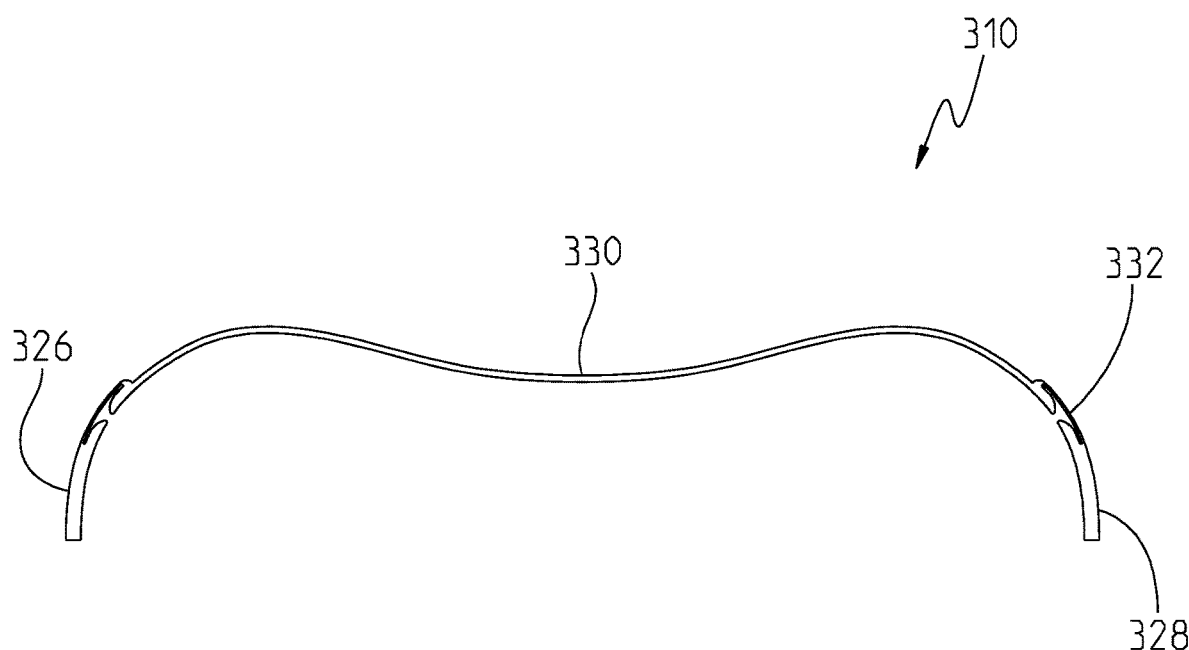
FIG. 27 is a side elevational view similar to FIG. 26, with the center portion shown in a deflected state.

FIGS. 25-27 illustrate another illustrative embodiment elastic bar 310 including many of the similar elements of the elastic bar 10 as detailed above. As such, in the following description similar features are identified with like reference numbers.

Figure 28:
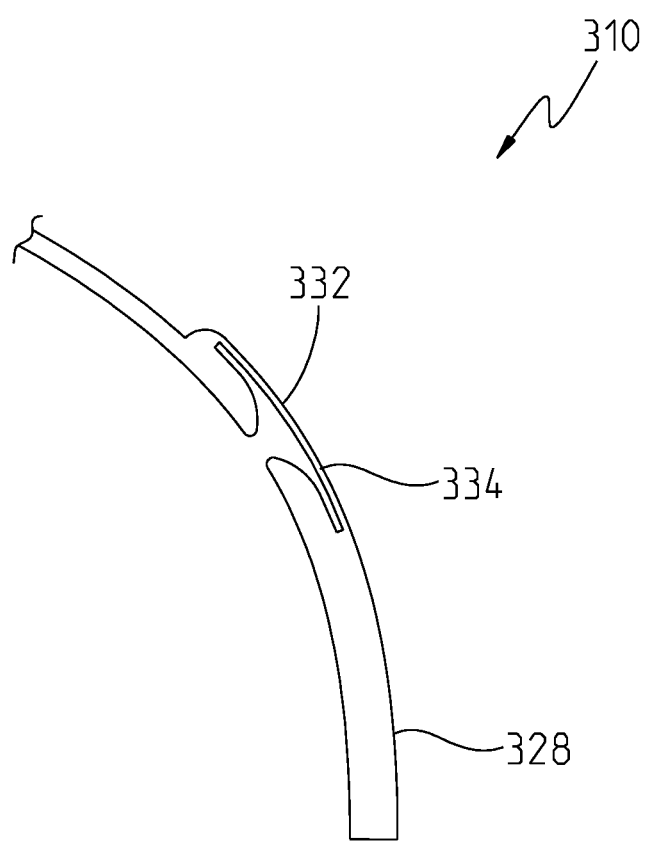
FIG. 28 is a detail view taken along line 28 of FIG. 26.

The elastic bar 310 includes opposing first and second end portions 326 and 328. A flexible center portion 330 illustratively extends between the end portions 326 and 328. The first and second end portions 326 and 328 include flaring reduction elements 332. More particularly, the flaring reduction elements 332 illustratively include compliant pseudo-pin joints 334 to reduce undesired outward flaring of the end portions 326 and 328 (FIG. 28).

Figure 29:
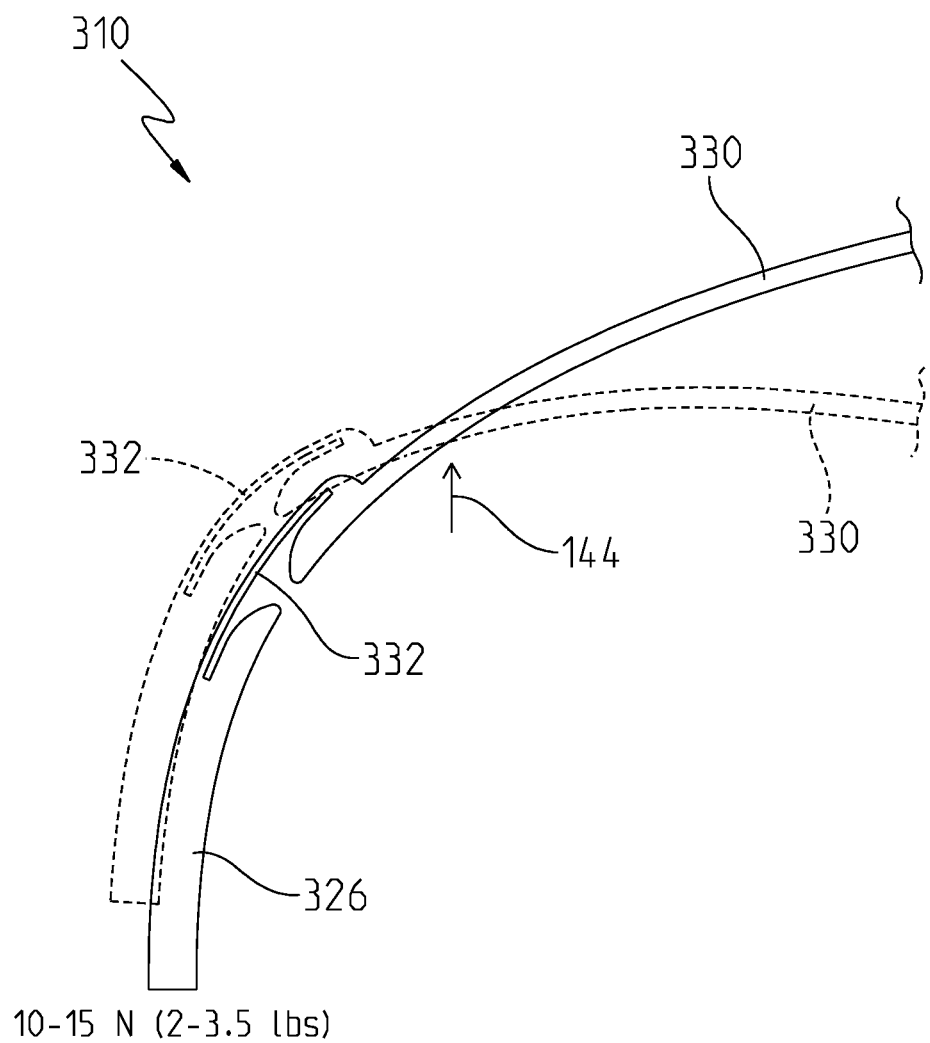
FIG. 29 is a detail diagrammatic illustration of wing flaring reduction from FIG. 20.

FIG. 29 is a detail diagrammatic illustration of wing flaring reduction from FIG. 20. With the addition of the respective wing flaring reduction elements 232, 332, additional functionality is possible. For example, low stiffness end portions 226, 326 and 228, 328 more easily adapt to individual patient anatomies and reduce intraoperative bar bending. Further, low stiffness end portions 226, 326 and 228, 328 could resolve patient outgrowth issues to adapt to growing patient anatomies.

Although the invention has been described in detail with reference to certain preferred embodiments, variations and modifications exist within the spirit and scope of the invention as described and defined in the following claims.

What is claimed is:

1. An elastic bar for pectus excavatum repair, the elastic bar comprising:
a first end portion;
a second end portion in spaced relation to the first end portion; and
a flexible center portion connecting the first end portion and the second end portion, the center portion being moveable from a first state to a second state, the center portion extending outwardly in a convex manner from the first end portion and the second end portion in the first state, and the center portion extending inwardly in a concave manner from the first end portion and the second end portion in the second state.

2. The elastic bar of claim 1, wherein the center portion is configured to deflect up to 40 millimeters from the first state to the second state.

3. The elastic bar of claim 1, wherein first end portion, the second end portion and the flexible center portion are integrally formed of a biocompatible material.

4. The elastic bar of claim 3, wherein the biocompatible material comprises Ti-64 titanium alloy.

5. The elastic bar of claim 1, wherein the first end portion, the second end portion and the flexible center portion each have a width of between 5 millimeters to 13.6 millimeters, and the flexible center portion has an arc length of less than 230 millimeters.

6. The elastic bar of claim 1, wherein the first end portion and the second end portion are stabilization members, and the center portion is a correction member.

7. The elastic bar of claim 6, wherein the first end portion and the second end portion each have a stiffness greater than the flexible center portion.

8. The elastic bar of claim 7, wherein the flexible center portion has a stiffness less than 4.5 Newton/millimeter.

9. The elastic bar of claim 8, wherein the flexible center portion has a stiffness of between 2.6 Newton/millimeter and 3.6 Newton/millimeter.

10. The elastic bar of claim 1, wherein the flexible center portion has a substantially uniform thickness of between 0.5 millimeters and 3.5 millimeters.

11. The elastic bar of claim 1, wherein the flexible center portion includes a plurality of regionally compliant flexural pivots.

12. The elastic bar of claim 11, wherein the regionally compliant flexural pivots include at least one of a small length flexural pivot or a lamina emergent torsional joint.

13. The elastic bar of claim 1, wherein the first end portion and the second end portion each including flaring reduction elements.

14. The elastic bar of claim 13, wherein the flaring reduction elements include at least one of a compliant pseudo-pin joint or a thinned wing.

15. An elastic bar for pectus excavatum repair, the elastic bar comprising:
   a first end portion;
   a second end portion in spaced relation to the first end portion; and
   a flexible center portion connecting the first end portion and the second end portion, the center portion being moveable from a first state to a second state, the center portion extending outwardly from the first end portion and the second end portion in the first state, and the center portion extending inwardly from the first end portion and the second end portion in the second state;
   wherein the first end portion and the second end portion each have a stiffness greater than the flexible center portion; and
   wherein the center portion is configured to deflect up to 40 millimeters from the first state to the second state.

16. The elastic bar of claim 15, wherein the center portion extends in a convex manner in the first state, and the center portion extends in a concave manner in the second state.

17. The elastic bar of claim 15, wherein the center portion is configured to deflect up to 40 millimeters from the first state to the second state.

18. The elastic bar of claim 15, wherein the first end portion, the second end portion and the flexible center portion each have a width of between 5 millimeters to 13.6 millimeters, and the flexible center portion has an arc length of less than 230 millimeters.

19. The elastic bar of claim 15, wherein the flexible center portion has a stiffness less than 4.5 Newton/millimeter.

20. The elastic bar of claim 19, wherein the flexible center portion has a stiffness of between 2.6 Newton/millimeter and 3.6 Newton/millimeter.

21. A method of correcting pectus excavatum, the method comprising the steps of:
   providing an elastic bar including a first end portion, a second end portion in spaced relation to the first end portion, and a flexible center portion connecting the first end portion and the second end portion;
   inserting the elastic bar within a chest cavity of a patient, wherein the first end portion and the second end portion engage opposing ribs, and the flexible center portion engages a sternum of the patient; and
   wherein the flexible center portion applies force against the sternum in an outward direction as the flexible center portion moves from a concave position to a convex position.

22. The method of claim 21, wherein the center portion is configured to deflect up to 40 millimeters from the first state to the second state.

23. The method of claim 21, wherein the first end portion and the second end portion each have a stiffness greater than the flexible center portion.

24. The method of claim 23, wherein the flexible center portion has a stiffness less than 4.5 Newton/millimeter.

* * * * *